(12) United States Patent
Satoh

(10) Patent No.: US 9,627,124 B2
(45) Date of Patent: Apr. 18, 2017

(54) IGNITION COIL WITH MOLDING MARK

(71) Applicant: DENSO CORPORATION, Kariya, Aichi-pref. (JP)

(72) Inventor: Yoshitaka Satoh, Toyohashi (JP)

(73) Assignee: DENSO CORPORATION, Kariya (JP)

(*) Notice: Subject to any disclaimer, the term of this patent is extended or adjusted under 35 U.S.C. 154(b) by 93 days.

(21) Appl. No.: 14/462,685

(22) Filed: Aug. 19, 2014

(65) Prior Publication Data

US 2015/0048914 A1 Feb. 19, 2015

(30) Foreign Application Priority Data

Aug. 19, 2013 (JP) ................ 2013-169551
Jun. 19, 2014 (JP) ................ 2014-126204

(51) Int. Cl.
| | | |
|---|---|---|
| H01F 27/02 | (2006.01) | |
| H01F 38/12 | (2006.01) | |
| B29C 45/14 | (2006.01) | |
| B29C 45/40 | (2006.01) | |
| B29K 101/12 | (2006.01) | |
| B29L 31/34 | (2006.01) | |
| B29C 45/00 | (2006.01) | |

(52) U.S. Cl.
CPC ..... *H01F 27/022* (2013.01); *B29C 45/14639* (2013.01); *B29C 45/401* (2013.01); *H01F 38/12* (2013.01); *B29C 45/0025* (2013.01); *B29C 45/14* (2013.01); *B29C 45/40* (2013.01); *B29C 2045/0027* (2013.01); *B29K 2101/12* (2013.01); *B29K 2995/0007* (2013.01); *B29L 2031/34* (2013.01)

(58) Field of Classification Search
CPC ................ H01F 38/12; H01F 27/022

USPC .......... 336/90, 92, 94, 96; 123/634, 635
See application file for complete search history.

(56) References Cited

U.S. PATENT DOCUMENTS

| | | | | |
|---|---|---|---|---|
| 2005/0134416 A1* | 6/2005 | Maekawa | ........... | H01F 38/12 336/92 |
| 2006/0226945 A1* | 10/2006 | Maekawa | ........... | H01F 38/12 336/90 |
| 2008/0266040 A1* | 10/2008 | Matsubayashi | ....... | H01F 27/022 336/96 |

FOREIGN PATENT DOCUMENTS

| | | |
|---|---|---|
| JP | 01-175710 | 7/1989 |
| JP | 06-244314 | 9/1994 |

(Continued)

OTHER PUBLICATIONS

Office Action (2 pages) dated Jun. 23, 2015, issued in corresponding Japanese Application No. 2014-126204 and English translation (3 pages).

*Primary Examiner* — Tsz Chan
(74) *Attorney, Agent, or Firm* — Nixon & Vanderhye P.C.

(57) ABSTRACT

In an ignition coil, a housing has an inner chamber, and a transformer is installed in the inner chamber of the housing. A molded side-core assembly of a transformer includes an arched side core magnetically coupled to first and second ends of a longitudinal center core and located outside a circumferential part of primary and secondary windings. The molded side-core assembly includes an insulation cover molded to cover at least part of the arched side core. The insulation cover has a surface and at least one molding mark formed on the surface thereof. An insulation filler is filled in the inner chamber of the housing while the at least part of the arched side core is exposed from the insulation filler and the at least one molding mark is hermetically sealed in the insulation filler.

6 Claims, 19 Drawing Sheets

(56) References Cited

FOREIGN PATENT DOCUMENTS

| | | | | |
|---|---|---|---|---|
| JP | 2008-277535 | | | 11/2008 |
| JP | 2009111027 | A | * | 5/2009 |
| JP | 2009-299552 | | | 12/2009 |
| JP | 2009-299614 | | | 12/2009 |
| JP | 2010-242851 | | | 10/2010 |
| JP | 2012-146896 | | | 8/2012 |
| JP | 2012146896 | A | * | 8/2012 |

* cited by examiner

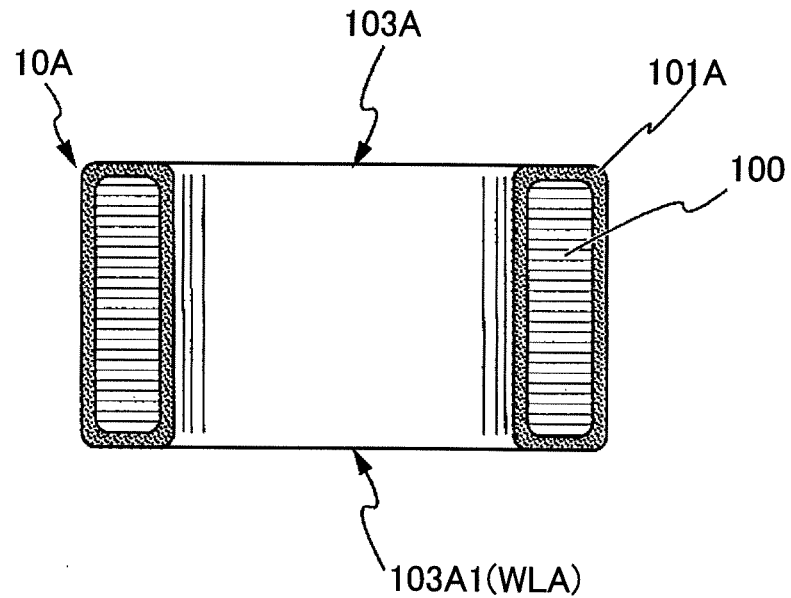
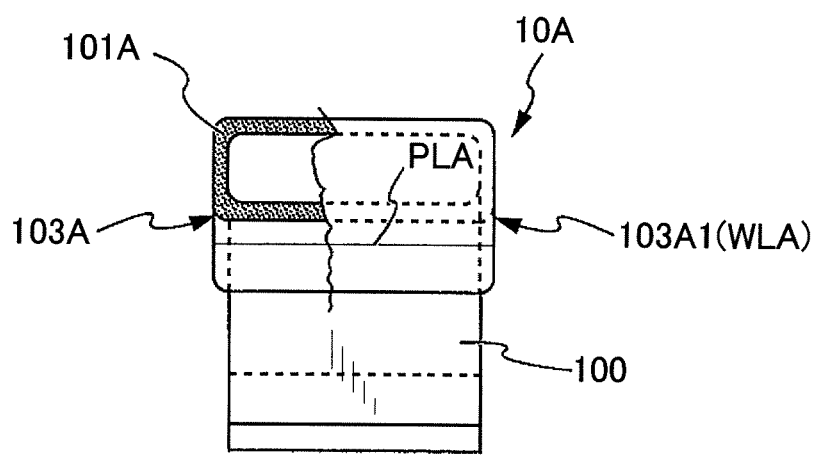

IGNITION COIL WITH MOLDING MARK

CROSS REFERENCE TO RELATED APPLICATIONS

This application is based on and claims the benefit of priority from Japanese Patent Applications 2013-169551 and 2014-126204 respectively filed on Aug. 19, 2013 and Jun. 19, 2014, the disclosure of each of which is incorporated in its entirety herein by reference.

TECHNICAL FIELD

The present disclosure relates to ignition coils for supplying a high voltage to a spark plug for internal combustion engines for ignition of fuel.

BACKGROUND

Ignition devices, in other words, ignition coils, are used for internal combustion engines for ignition of their fuel. An example of specific structures of such an ignition device is disclosed in Japanese Patent Application Publication No. 2009-299614. The ignition device disclosed in the Patent Application Publication includes an insulating-resin case having an inner chamber, connectors, and a high-pressure tower. The ignition device also includes a transformer and a switching module installed in the inner chamber of the case.

The transformer is comprised of: a looped iron-core module having a longitudinal center core; a primary winding, i.e. a primary coil, wound around the center core; and a secondary winding, i.e. a secondary coil, wound around the primary winding. The iron-core module also has an arched side core magnetically coupled to both ends of the center core; the arched side core is located outside a circumferential part of each of the primary and secondary coils. This forms a closed magnetic path. The switching module is connected between the connectors and the primary winding, and operative to open or close electrical connection between the connectors and the primary winding. The ignition device includes a resin filler filled in the inner chamber of the case. The transformer and the switching module are entirely embedded in the resin filler so as to be hermetically sealed in the resin filler.

The structure of the ignition device disclosed in the Patent Application Publication may make it difficult to exhaust heat generated from the transformer and/or the switching module, resulting in an increase of thermal stress in the resin filler and/or the case against cold stress. This may cause cracks in the resin filler and/or the case.

To address such a problem, an exposure of a part of the arched side core from the case will improve heat dissipation of the ignition device to suppress an increase of thermal stress in the resin filler and/or the case, thus preventing the occurrence of cracks in the resin filler and/or the case (see Japanese Patent Application Publication No. 2012-146896).

SUMMARY

The exposed part of the arched side core from the case, i.e. the resin filler, results in no electrical insulation and no waterproofing thereof. Thus, there are requirements to ensure electrical insulation and waterproofing of the exposed part of the arched side core from the case.

In order to meet these requirements, there is an idea to provide a molded side-core assembly comprised of the arched side core and an insulation cover covering at least the exposed part of the arched side core. This ensures electrical insulation and waterproofing of the exposed part of the arched side portion of the looped iron core while improving heat dissipation of the ignition coil.

The molded side-core assembly is normally formed by insert molding. Specifically, a previously built mold having a cavity, whose shape is substantially identical to the shape of the molded side-core assembly, is loaded with an insert corresponding to the arched side core. Molten insulation resin for the insulation cover is injected, into the mold. Upon cooling, the injected resin is hardened, so that the mold is opened and ejector pins are driven forward to push the hardened component from the mold cavity, thus demolding the hardened component as the molded side-core assembly.

The process of demolding the hardened component using the ejector pins during insert molding may result in an ejector-pin mark, i.e. an ejector-pin dent, on the surface of the insulation cover of the molded side-core assembly. The ejector-pin dent may reduce the thicknesses of the corresponding dented portion of the insulation cover. A gate, i.e. an orifice, formed in the mold to serve as an entrance to the cavity for injection of molten resin into the cavity may result in a weld line and/or a void on the surface or interior of the insulation cover at or around the position of the gate. The weld-line and/or the void may result from the meeting of two or more flows of the injected resin and/or the rapid change of flow of the injected resin.

These molding marks including an ejector-pin mark, a weld-line, and a void present on the surface and/or the interior of the insulation cover may result in the insulation cover having locally weak portions adjacent to the surface of the resin filler. Exposure of the ignition device installed in a motor vehicle to cold stress may result in thermal stress being focused on the locally weak portions of the insulation cover. This may cause cracks to easily occur at some locally weak portions of the insulation cover.

If cracks occurred at some locally weak portions of the insulation cover while the positions of the cracks were exposed from the insulation cover, external or internal moisture might enter into the side core through the cracks, there being a possibility of corrosion of the side core. Expansion of the side core due to its corrosion might cause cracks in the resin filler around the side core, there being a possibility of leakage of a high voltage from the ignition device to the exterior of the ignition device.

Addition of external impact to the locally weak portions of the insulation cover may cause the progress of cracks at some locally weak portions of the insulation cover.

Particularly, if the ignition device is installed in a motor vehicle while one side surface the insulation cover is disposed horizontally, location of molding marks of the insulation cover at the horizontal side surface of the insulation cover may result in a puddle of water on the molding marks of the insulation cover. This may cause cracks to easily occur at the molding marks of the insulation cover.

In view of the circumstances set forth above, one aspect of the present disclosure seeks to provide ignition coils which are capable of addressing the aforementioned problems.

Specifically, an alternative aspect of the present disclosure aims to provide such ignition coils, each of which is capable of reinforcing at least one locally weak portion of an insulation cover due to corresponding to at least one molding mark on or in the insulation cover. This is capable of:

reducing the occurrence of cracks;

preventing the entrance of moisture into at least one crack even if the at least one crack occurs at a molding mark on the insulation cover; and/or preventing the progress of at least one crack even if the at least one crack occurs at a molding mark on the insulation cover.

According to a first exemplary aspect of the present disclosure, there is provided an ignition coil. The ignition coil includes a housing having an inner chamber, and a transformer installed in the inner chamber of the housing. The transformer includes a longitudinal center core having first and second ends, a primary winding wound around the longitudinal center core, a secondary winding wound around the primary winding, and a molded side-core assembly. The molded side-core assembly includes an arched side core magnetically coupled to the first and second ends of the longitudinal center core and located outside a circumferential part of the primary and secondary windings, and an insulation cover molded to cover at least part of the arched side core. The insulation cover has a surface and at least one molding mark formed on the surface thereof. The ignition coil includes an insulation filler filled in the inner chamber of the housing while the at least part of the arched side core is exposed from the insulation filler and the at least one molding mark is hermetically sealed in the insulation filler.

The at least one molding mark of the ignition coil according to the first exemplary aspect of the present disclosure is hermetically sealed in the insulation filler, resulting in reinforcement of a portion of the surface of the insulation cover at which the at least one molding mark is formed. This prevents of reduces the occurrence of a crank at the portion of the surface of the insulation cover, resulting in an improvement of the reliability of the ignition coil.

According to a second exemplary aspect of the present disclosure, there is provided a method of manufacturing an ignition coil. The ignition coil includes a housing having an inner chamber, and a transformer installed in the inner chamber of the housing. The transformer includes a longitudinal center core having first and second ends, a primary winding wound around the longitudinal center core, a secondary winding wound around the primary winding, and a molded side-core assembly. The molded side-core assembly includes an arched side core magnetically coupled to the first and second ends of the longitudinal center core and located outside a circumferential part of the primary and secondary windings, and an insulation cover molded to cover at least part of the arched side core. The insulation cover has a surface and at least one molding mark formed on the surface thereof. The ignition coil includes an insulation filler filled in the inner chamber of the housing while the at least part of the arched side core is exposed from the insulation filler and the at least one molding mark is hermetically sealed in the insulation filler. The method includes preparing the housing, the longitudinal center core, the primary winding, and the secondary winding. The method includes preparing a mold having a cavity therein, the cavity matching in shape with the molded side-core assembly, the mold having a gate formed therethrough and communicating with the cavity, and at least one ejector-pin hole formed therethrough. The method includes inserting the arched side core in the cavity at a predetermined position in the cavity, and injecting molten resin into the cavity through the gate. The method includes, after the resin in the cavity is hardened so that the insulation cover is formed together with the arched side core, opening the mold. The method includes inserting an ejector pin into the at least one ejector-pin hole to push the hardened resin to demold the hardened resin from the cavity, so that the molded side-core assembly is formed. The insulation cover has the at least one molding mark formed on the surface thereof. The method includes assembling the molded side-core assembly, the longitudinal center core, the primary winding, and the secondary winding into the transformer. The method includes installing the transformer into the inner chamber of the housing. The method includes filling the insulation filler into the inner chamber of the housing while the at least part of the arched side core is exposed from the insulation filler, and the at least one molding mark is hermetically sealed in the insulation filler.

This method according to the second exemplary aspect of the present disclosure easily hermetically seals the at least one molding mark formed on the surface of the insulation cover, thus easily providing the ignition coil having higher reliability.

Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which:

FIG. 5C is a schematic bottom view of the molded side-core assembly of the ignition coil according to the second embodiment;

FIG. 5D is a lateral side view of the molded side-core assembly of the ignition coil according to the second embodiment;

DETAILED DESCRIPTION OF EMBODIMENT

Figure 1A:
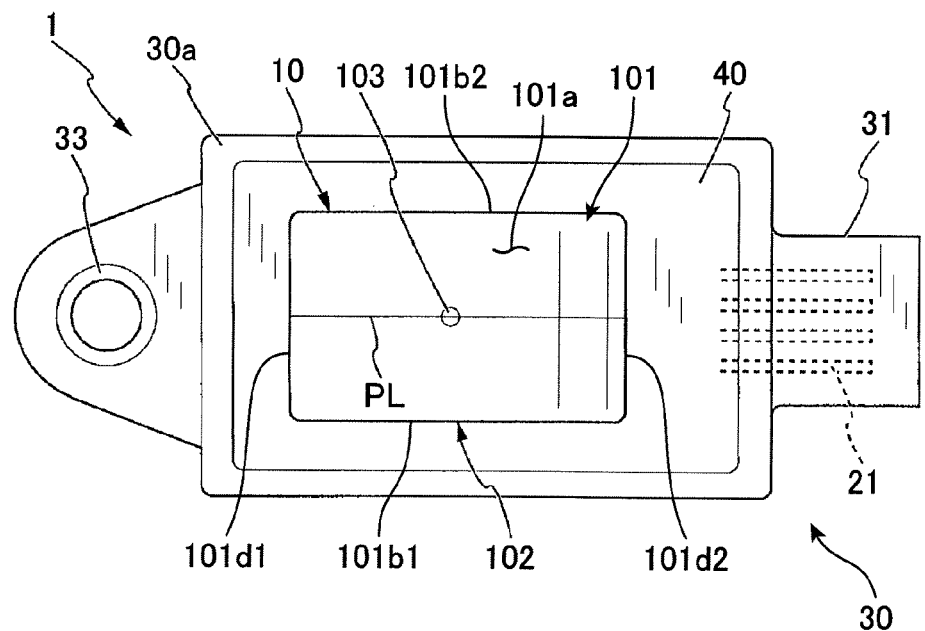
FIG. 1A is a schematic top view of an ignition coil according to a first embodiment of the present disclosure.

Specific embodiments of the present disclosure will be described hereinafter with reference to the accompanying drawings. In the embodiments, like parts between the embodiments, to which like reference characters are assigned, are omitted or simplified in order to eliminate redundant description.

First Embodiment

An ignition coil 1 according to a first embodiment of the present disclosure will be described with reference to FIGS. 1A to 3D.

Figure 1B:
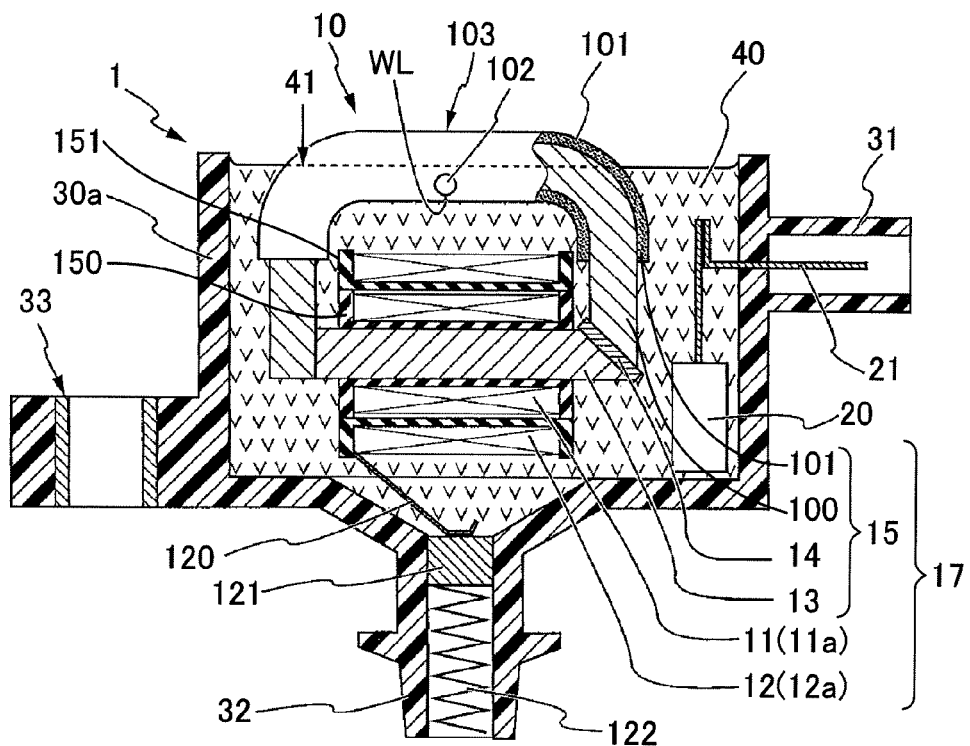
FIG. 1B is a longitudinal cross section of the ignition coil illustrated in FIG. 1A.
Figure 1C:
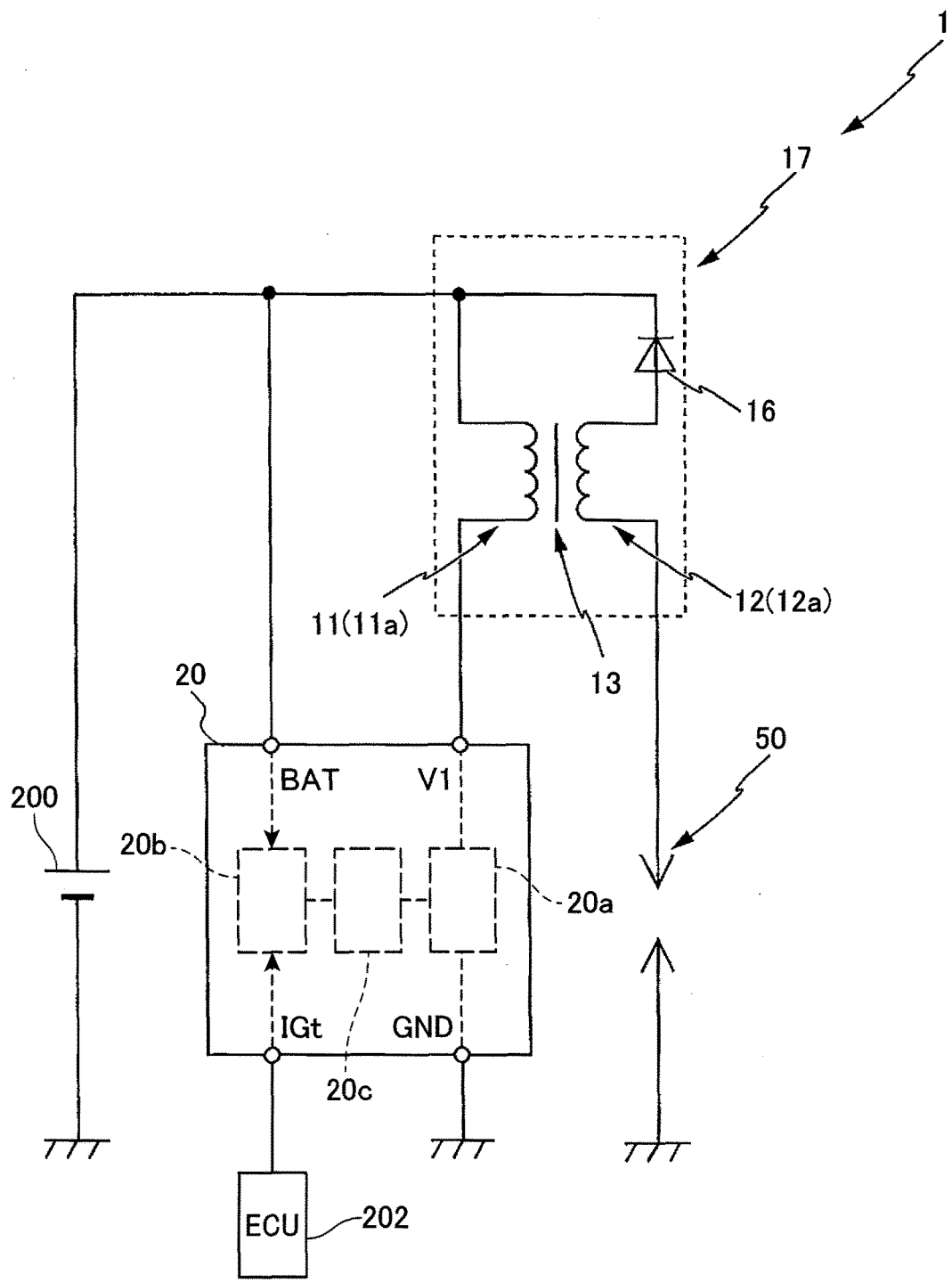
FIG. 1C is a circuit diagram schematically illustrating the circuit structure of the ignition coil illustrated in FIGS. 1A and 1B.

Referring to FIGS. 1A and 1B, the ignition coil 1 includes a housing 30, a transformer 17, a resin filler 40, a circuit module 20, lead wires 21, a relay terminal 120, a high-voltage terminal 121, and a spring terminal, i.e. a coil spring, 122.

The housing 30 is comprised of a case 30a having for example, a substantially rectangular parallelepiped shape with an inner chamber. Specifically, the case 30a has a bottom wall with a terminal hole, an opening top wall opposing the bottom wall, a pair of opposing longitudinal sidewalls, and a pair of opposing lateral sidewalls. The transformer 17, the resin filler 40, the circuit module 20, part of the lead wires 21, and relay terminal 120 are installed in the inner chamber of the case 30a.

The housing 30 is comprised of a tubular connector 31 disposed projectingly from the outer surface of one lateral sidewall of the case 30a to communicate with the inner chamber through the lateral sidewall. The housing 30 is comprised of a tubular plug cap 32 having a first longitudinal end continuously connected to the peripheral portion of the terminal hole of the bottom wall of the case 30a. The tubular plug cap 32 also has a second longitudinal end whose shape is designed to be fittable to the head of a spark plug 50 of a cylinder of an internal combustion engine (see FIG. 1C). The housing 30 has a flange 33 outwardly extending from the other lateral sidewall of the case 30a; the flange 33 has an installation hole 33a that is fixable to a predetermined portion, such as the head, of the internal combustion engine.

The resin filler 40 is filled in the inner chamber of the case 30a, so that a major part of the transformer 17, the circuit module 20, part of the lead wires 21, and the relay terminal 120 are so embedded in the resin filler 40 as to be hermetically sealed in the resin filler 40.

The transformer 17 is comprised of a looped iron-core module 15 having a longitudinal columnar center core 13, a primary coil 11 disposed to surround the center core 13, a secondary coil 12 disposed to surround the primary coil 11, and a diode 16.

The looped iron-core module 15 constitutes a closed magnetic path. The center core 13 has first and second ends in its longitudinal direction. The center core 13 is disposed in a center portion of the inner chamber of the case 30a so as to face the bottom wall of the case 30a in parallel to the longitudinal sidewalls of the case 30a.

The primary coil 11 is comprised of a cylindrical insulation bobbin, referred to simply as a primary bobbin, 150 located coaxially around the center core 13, and a primary winding 11a wound around the primary bobbin 150. This results in the primary winding 11a being wound around the center core 13. For example, an available insulated conductor is used as the primary winding 11a. The available insulated conductor is comprised of: an electrical conductor wire made from, for example, copper or aluminum; and an insulating film made from, for example, polyurethane or polyester coating around the conductor wire. The primary winding 11a is wound around the primary bobbin 150 at preset N1 times to constitute the primary coil 11.

A first end of the primary winding 11a is connected to one of the lead wires 21, and a second end of the primary winding 11a, which is opposite to the first end thereof, is connected to the circuit module 20. The circuit module 20 is connected to some of the lead wires 21. The lead wires 21 are pulled out from the case 30a via the connector 31, so that they are connected via a connector harness to a power supply, such as a battery, 200 and an ECU (Electronic Control Unit) 202 (see FIG. 1C). For example, the power supply 200 supplies a terminal voltage to the circuit module 20 as its operating voltage, and to the primary winding 11.

The secondary coil 12 is comprised of a cylindrical insulation bobbin, referred to simply as a secondary bobbin, 151 located coaxially around the primary coil 11, and a secondary winding 12a wound around the secondary bobbin 151. This results in the secondary winding 12a being wound around the primary winding 11a. The secondary winding 12a can be similarly made from an available insulated conductor used as the primary winding 11a. The secondary winding 12a is wound around the secondary bobbin 151 at preset N2 times to constitute the secondary coil 12.

A first end of the secondary winding 12a is connected to the first end of the primary winding 11a via the diode 16, and a second end of the secondary winding 12a, which is opposite to the first end thereof, is connected to a first end of the relay terminal 120.

As illustrated in FIG. 1B, the high-voltage terminal 121 is fixedly disposed in the first longitudinal end of the tubular plug cap 32. A second end of the relay terminal 120, which is opposite to the first end thereof, is connected to the high-voltage terminal 121. The spring terminal 122 is disposed in the tubular plug cap 32 between the first and second ends of the tubular plug cap 32. When the head of a spark plug 50 is fitted to the second end of the tubular plug cap 32, the spring terminal 122 is pressed by a center electrode of the spark plug 50 while electrically connected to the center electrode of the spark plug 50. This causes the spring terminal 122 to establish electrical connection between the center electrode of the spark plug 50 and the high-voltage terminal 121 while giving preset elastic force to both the center electrode of the spark plug 50 and the high-pressure terminal 121. This securely maintains the electrical connection between the high-voltage terminal 121, in other words, the secondary winding 12a, and the center electrode of the spark plug 50.

The circuit module 20 has, for example, four terminals BAT, IGt, V1, and GND. The terminal BAT is connected to an electrical line between the power supply 200 and the first end of the primary winding 11a. The terminal IGt is connected to the ECU 202 set forth above. The terminal V1 is connected to the second end of the primary winding 11a set forth above, and the terminal GND is connected to a common potential line, i.e. a ground line, of the ignition coil 1.

The circuit module includes a switching element, such as a power MOSFET, an IGBT, or the like, 20a connected between the terminals V1 and the GND. The circuit module 20 also includes a control IC 20b and a driver 20c connected to the control IC and the switching element 20a.

For example, the control IC 20b is operative to monitor the terminal voltage supplied to the primary winding 11a, and to control the driver 20c to open or close the switching element 20a based on the monitored primary voltage and ignition signals IGt sent from the ECU 202 via the terminal IGt. The open and close control of the switching element 20a controls energization and deenergization of the primary winding 11a based on the terminal voltage supplied from the power supply 200, thus inducing a primary voltage across the primary winding 11a based on change of magnetic flux through the closed magnetic path of the looped iron-core module 15, i.e. self-induction. This generates a high secondary voltage, which is proportional to the product of the ratio of N2 to N1 and the primary voltage, induced across the secondary winding 12a based on change of magnetic flux through the closed magnetic path of the looped iron-core module 15, i.e. mutual-induction. This applies the high secondary voltage to the spark plug 50 for ignition of the spark plug.

Specially, in the ignition coil 1 according to the first embodiment, the looped iron-core module 15 includes a molded side-core assembly 10 and a permanent magnet 14.

The molded side-core assembly 10 is comprised of an arched side core 100 and an insulation cover 101.

The arched side core 100 has a substantially C-shape and is located outside a circumferential part of each of the primary and secondary coils 11 and 12. In other words, the arched side core 100 is disposed bridging across the first and second ends of the center core 13 outside a circumferential part of each of the primary and secondary coils 11 and 12.

The C-shaped side core 100 has a longitudinal columnar base 100a and two legs 100b and 100c. Each of the legs 100b and 100c has a curved first end continuously connecting to a corresponding one of longitudinal ends of the columnar base 100a. Each of the legs 100b and 100c also has a second end, which is opposite to the first end, magnetically coupled to a corresponding one of the first and second ends of the center core 13. For example, the second end of the leg 100b is magnetically coupled to the second end of the center core 13 via the permanent magnet 14. This configuration of the center core 13 and the arched side core 100 constitutes the aforementioned closed magnetic path.

For example, the center core 13 is comprised of the stack of a plurality of thin silicon-steel plates, each having a rectangular-parallelepiped shape. Similarly, the arched side core 100 is comprised of the stack of a substantially C-shaped thin silicon-steel plates.

The insulation cover 101 is molded together with the arched side core 100 to form the molded side-core assembly 10 such that the insulation cover 101 covers at least the columnar base 100a and the first ends of the respective legs 100b and 100c of the arched side core 100.

As illustrated in FIGS. 2A to 2D, the insulation cover 101 has an arched top surface 101a, a pair of C-shaped longitudinal side surfaces 101b1 and 101b2 parallely opposite to each other, and an arched bottom surface 101c opposite to the top surface 101a. The insulator cover 101 also has a pair of curved lateral side surfaces 101d1 and 101d2 opposite to each other.

Specifically, as illustrated in FIG. 1B, the molded side-core assembly 10 is embedded in the resin filler 40 filled in the inner chamber of the case 30a while:

the center core 13 is disposed in the center portion of the inner chamber of the case 30a so as to face the bottom wall of the case 30a in parallel to the longitudinal sidewalls of the case 30a; and a top part of the molded side-core assembly 10, i.e. a top part of each of the arched side core 100 and the insulation cover 101 is exposed from the surface (see reference character 41 in FIGS. 1B and 2B) of the resin filler 40 filled in the inner chamber of the case 30a.

This ensures electrical insulation and waterproofing of the exposed part of the arched side core 100 while improving heat dissipation of the ignition coil 1 to thereby prevent an increase of thermal stress in the resin filler 40 and/or the case 30a against cold stress.

The molded side-core assembly 10 is formed by insert injection molding according to the first embodiment. Note that the molded side-core assembly 10 can be formed by insert compression molding or insert transfer molding.

Specifically, a previously built mold having a cavity, whose shape is substantially identical to the shape of the molded side-core assembly 10, is loaded with an insert corresponding to the arched side core 100. Molten insulation resin for the insulation cover 101 is injected into the mold. PET resin, PBT resin, resin whose thermal expansion coefficient is close to the thermal expansion coefficient of the resin filler 40, or another resin can be used as the molten insulation resin for the insulation cover 101. Fiber-reinforced resin, which is made of resin reinforced with fiber(s) for improvement of mechanical strength, high heat-dissipation resin for improvement of heat dissipation, or the like can also be used as the molten insulation resin for the insulation cover 101.

Upon cooling after the injection, the injected resin is hardened, so that the mold is opened at a parting line and ejector pins are driven forward to push the component in the mold cavity, thus demolding the component as the molded side-core assembly 10.

The process of molding, i.e. insert molding, results in an ejector-pin mark, i.e. an ejector-pin dent, 102 on the surface of the insulation cover 101 of the molded side-core assembly 10. A gate formed in the mold to serve as an entrance of the cavity for injection of molten resin into the cavity results in a gate mark 103 on a position of the surface of the insulation cover 101; the position of the gate mark 103 matches with the position of the gate formed on the mold.

Figure 2A:
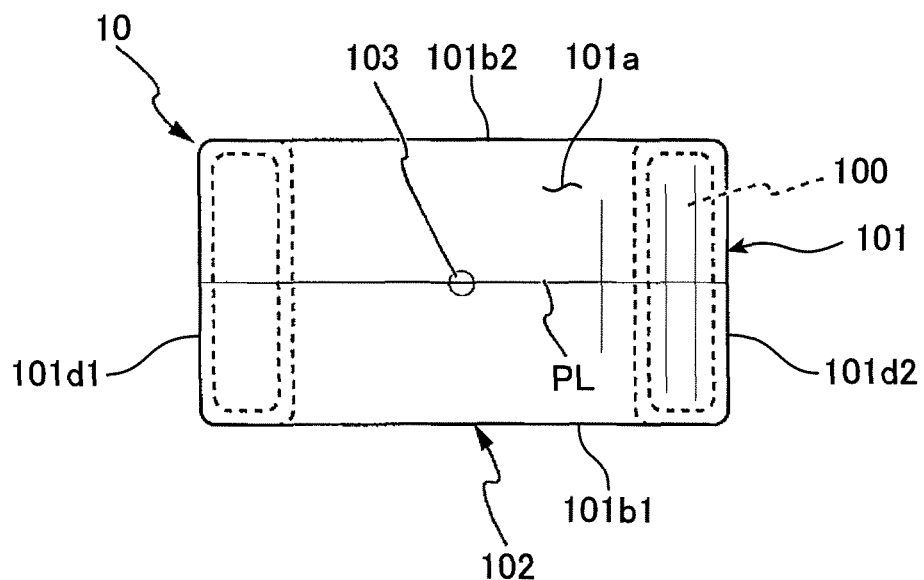
FIG. 2A is a schematic top view of a molded side-core assembly of the ignition coil according to the first embodiment.
Figure 2B:
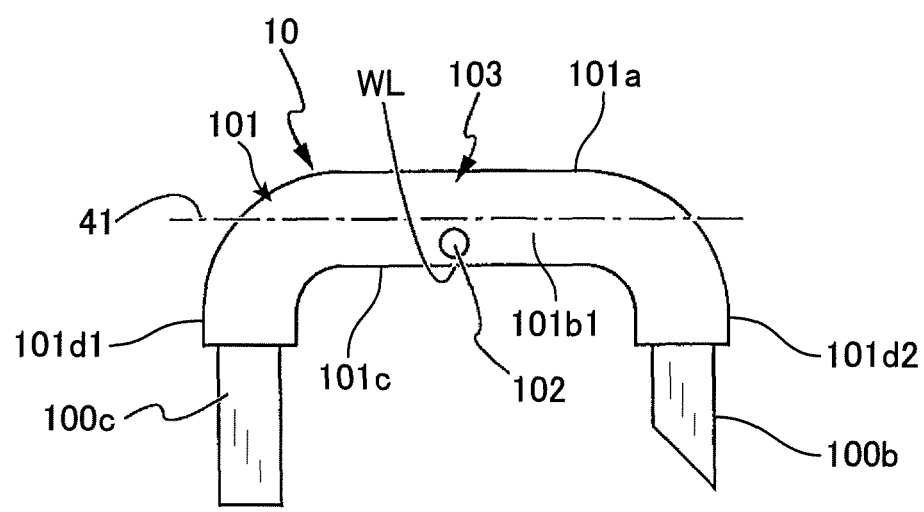
FIG. 2B is a longitudinal side view of the molded side-core assembly of the ignition coil according to the first embodiment.
Figure 2C:
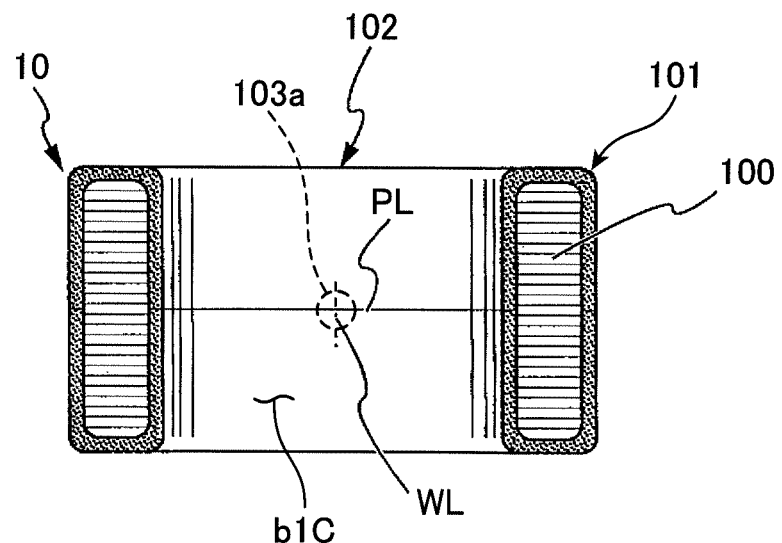
FIG. 2C is a schematic bottom view of the molded side-core assembly of the ignition coil according to the first embodiment.
Figure 2D:
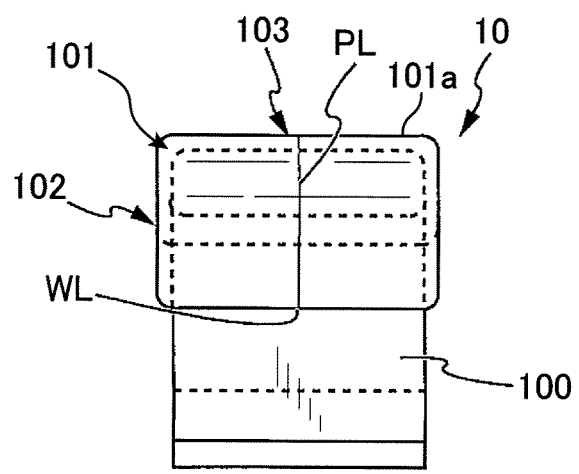
FIG. 2D is a lateral side view of the molded side-core assembly of the ignition coil according to the first embodiment.

For example, as illustrated in FIGS. 2A and 2B, the gate mark 103 is formed at a substantially center position of the top surface 101a of the insulation cover 101. A parting line PL is so formed on the top surface 101a of the insulation cover 101 as to pass through the gate mark 103 in parallel to the C-shaped longitudinal side surfaces 101b1 and 101b2 of the insulation cover 101. The ejector-pin mark 102 is formed on one C-shaped longitudinal side surface 101b1 of the insulation cover 101. Specially, the ejector-pin mark 102 is located to be lower than the exposed top part of the insulation cover 101; the exposed top part of the insulation cover 101 is located to be higher than the dashed-dotted line 41 illustrated in FIG. 2B.

Specially, the ignition coil 1 according to the first embodiment is configured such that the elector-pin mark 102 of the insulation cover 101 and a portion 103a of the bottom surface 101c of the insulation cover 101, which is opposite to the gate mark 103 are embedded in the resin filler 40. The portion 103a will be referred to as a gate-mark opposite portion as an example of the molding marks. A weld-line WL may be formed at or around at least one of the gate mark 103 and the gate-mark opposite portion 103a. A parting line PL is formed along respective mating faces of divided parts of the mold.

Next, a specific method of manufacturing the molded side-core assembly 10 of the ignition coil 1 will be described hereinafter with reference to FIGS. 3A to 3D.

Figure 3A:
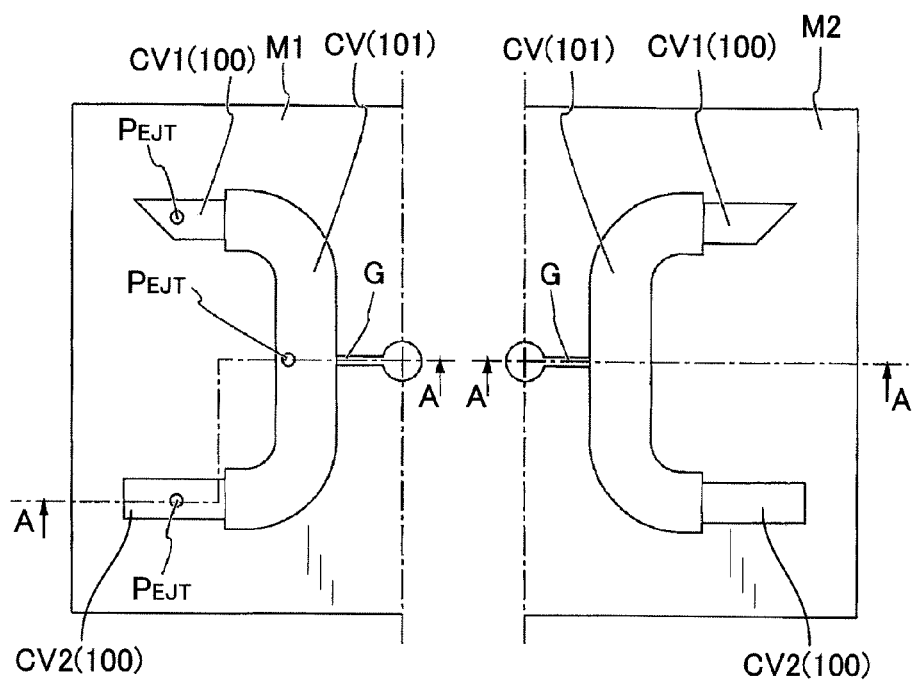
FIG. 3A is a plan view schematically illustrating a pair of first and second mold segments of a mold used for manufacturing the molded side-core assembly according to the first embodiment.

FIG. 3A schematically illustrates a pair of first and second mold segments M1 and M2 of a mold M while the mold M is opened at a parting plane, i.e. a parting line, PL described later, so that the first and second mold segments M1 and M2 are separated from each other.

Each of the first and second mold segments M1 and M2 has a substantially rectangular parallelepiped shape.

Each of the first and second mold segments M1 and M2 has first and second cavities CV1(100) and CV2(100) formed therein. The first and second cavities CV1(100) and CV2(100) of the first segment M1 are symmetric in shape with the first and second cavities CV1(100) and CV2(100) of the second segment M2 with respect to the parting line PL.

The first cavity CV1(100) of the first segment M1 matches with the leg 100b of a corresponding first-half arched part of the arched side core 100, and the second cavity CV2(100) of the first segment M1 matches with the leg 100c of the corresponding first-half arched part of the arched side core 100.

Similarly, the first cavity CV1(100) of the second segment M2 matches with the leg 100b of a corresponding second-half arched part of the arched side core 100, and the second cavity CV2(100) of the second segment M2 matches with the leg 100c of the corresponding second-half arched part of the arched side core 100.

Each of the first and second mold segments M1 and M2 has a third cavity CV(101) formed therein communicating with the first and second cavities CV1(100) and CV2(100) of a corresponding one of the first and second mold segments M1 and M2. The third cavity CV(101) of the first mold segment M1 is symmetric in shape with the third cavity CV(101) of the second segment M2 with respect to the parting line PL. The shape of the third cavity CV(101) of the first mold segment M1 is identical to the shape of a corresponding first-half C-shaped part of the insulation cover 101. Similarly, the shape of the third cavity CV(101) of the second mold segment M2 is identical to the shape of a corresponding second-half C-shaped part of the insulation cover 101.

When the first and second mold segments M1 and M2 are closed to constitute the mold M, a gate, i.e. an orifice, G is formed to face a portion of the third cavities CV(101) of the first and second segments M1 and M2. The portion of the third cavities CV(101) corresponds to the substantially center position of the top surface 101a of the insulation cover 101.

Specifically, an assembled cavity based on the first and second cavities CV1(100) and CV2(100) and the third cavities CV(101) when the first and second mold segments M1 and M2 are closed matches in shape with the molded side-core assembly 10 to be manufactured.

For example, first to third ejector-pin holes are formed through the first mold segment M1. The first ejector-pin hole communicates with the third cavity CV(101), and is located to face a portion of the third cavity CV(101) matching with the C-shaped longitudinal side surface 101b1 of the insulation cover 101. The second ejector-pin hole communicates with the first cavity CV1(100), and is located to face a portion of the first cavity CV1(100) matching with the leg 100b of the arched side core 100. Similarly, the third ejector-pin hole communicates with the second cavity CV2(100), and is located to face a portion of the second cavity CV2(100) matching with the leg 100c of the arched side core 100.

In each of the first to third ejector-pin holes, an ejector pin PEST is inserted such that an end of the ejector pin PEST is flush with the inner periphery of a corresponding cavity for removal of the molded side-core assembly 10 from the first mold segment M1.

Figure 3B:
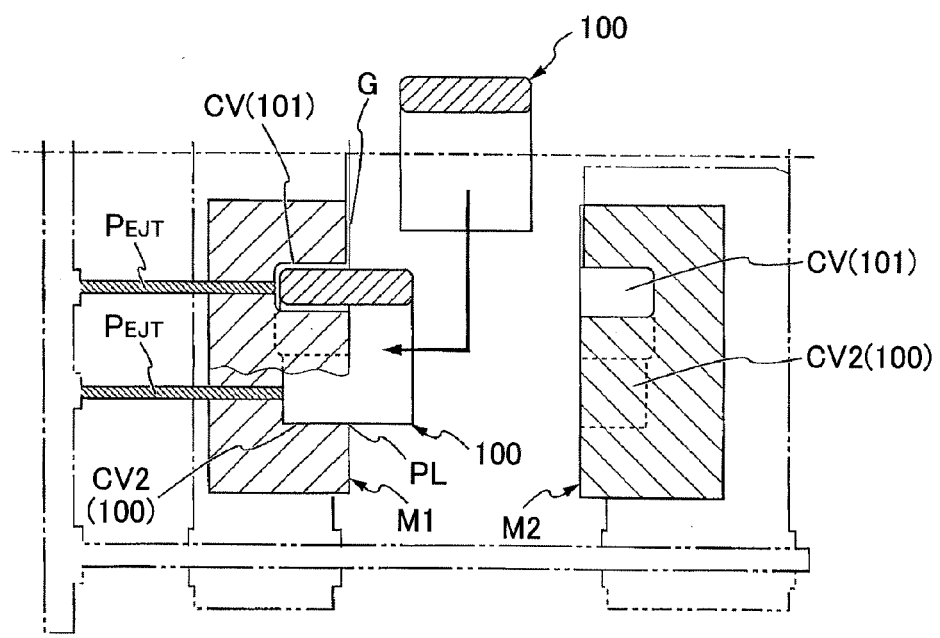
FIG. 3B is a cross sectional view, taken across line A-A of FIG. 3A, illustrating how an arched side core is inserted into a cavity of the first mold segment according to the first embodiment.

The method according to the first embodiment opens the closed mold M at the parting plane, i.e. parting line, PL, that crosses the closed mold M along the longitudinal direction of the side core 100, i.e. crosses perpendicularly all the stacked C-shaped thin silicon-steel plates of the side core 100 (see FIG. 3B). As described later, the method can open the closed mold M at the parting plane, i.e. parting line, PLA that crosses the closed mold M along the lateral direction of the insulation cover 101A, i.e. crosses the closed mold M parallel to the plurality of C-shaped thin silicon-steel plates of the side core 100.

As illustrated in FIG. 3B, the corresponding first-half arched part of the arched side core 100 is fitted in the first, second, and third cavities CV1(100), CV2(100) and CV(101) of the first mold segment M1. Thereafter, the first and second mold segments M1 and M2 are closed to constitute the mold M so that the corresponding second-half arched part of the arched side core 100 is fitted in the first, second, and third cavities CV1(100), CV2(100), and CV(101) of the second mold segment M2 (see FIG. 3C). That is, the first cavities CV1(100) of the first and second mold segments M1 and M2 are mated to each other to form a first cavity CV1(100) of the mold M corresponding to the leg 100b of the arched side core 100. Similarly, the second cavities CV2(100) of the first and second mold segments M1 and M2 are mated to each other to form a second cavity CV2(100) of the mold M corresponding to the leg 100c of the arched side core 100. The third cavities CV(101) of the first and second mold segments M1 and M2 are mated to each other to form a third cavity CV(101) of the mold M corresponding to the insulation cover 101.

Figure 3C:
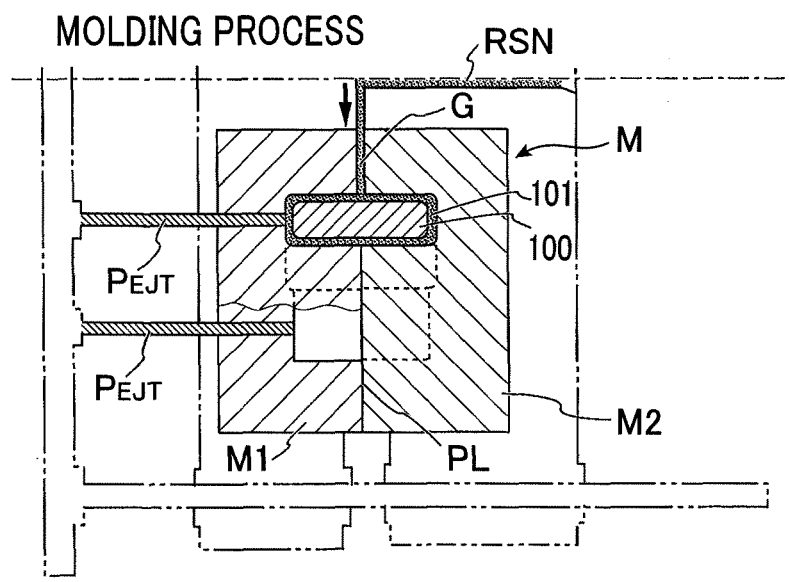
FIG. 3C is a cross sectional view, taken across line A-A of FIG. 3A, illustrating how molten resin is injected to the cavity of the first and second mold segments that are closed according to the first embodiment.

Then, as illustrated in FIG. 3C, molten insulation resin RSN is injected into the third cavity CV(101) of the mold M through the gate G. Preferably, when the first and second mold segments M1 and M2 are closed to constitute the mold M, at least one vent appears as a small tunnel going from the third cavity CV101 of the mold M to the outer surface of the closed mold M. This makes it possible that molten insulation resin RSN is injected into the third cavity CV(101) of the mold M while air in the third cavities CV(101) is exhausted from the third cavities CV(101). This prevents defects, such as bubbles, from occurring in the insulation cover 101.

Note that, as described above, the ejector pin $P_{EJT}$ is inserted in each of the first to third ejector-pin holes such that the end of the ejector pin $P_{EJT}$ is flush with the inner periphery of a corresponding cavity during the injection process. As another example, a movable ejector pin can be used as the ejector pin $P_{EJT}$. The movable ejector pin is inserted in each of the first to third ejector-pin holes such that the end of the movable ejector pin is flush with the surface of the arched side core 100 inserted in the first cavity CV(100) before the injection process. Thereafter, when the injection process is started, the movable ejector pin is driven backward, so that the end thereof is flush with the inner periphery of a corresponding cavity.

Upon cooling after the injection, the injected resin RSN is hardened. Then, the mold M is opened at the parting plane (parting line) PL, and the ejector pins $P_{EJT}$ are driven forward to push the hardened component in the first, second, and third cavities CV1(100), CV2(100), and CV(101). This demolds the hardened component as the molded side-core assembly 10.

Thereafter, the molded side-core assembly 10, the center core 13, and the permanent magnet 14 are assembled to each other to constitute the looped iron-core module 15 as illustrated in FIG. 1. The primary coil 11 is fitted around the center core 13, and the secondary coil 12 is fitted around the primary coil 11 as illustrated in FIG. 1, so that the transformer 17 is assembled.

Then, the transformer 17 is installed in the inner chamber of the case 30a. The relay terminal 120 is connected to the high-voltage terminal 121, the lead wires 21 are pulled out from the case 30a via the connector 31, so that they are connected via the connector harness to the power supply 200 and the ECU 202. The spring terminal 122 is pressed by a center electrode of the spark plug 50 while electrically connected to the center electrode of the spark plug 50.

Thereafter, liquid resin filler 40 is filled in the inner chamber of the case 30a, and the transformer 17 is inserted in the liquid resin filler 40 while the top part of the molded side-core assembly 10, i.e. the top part of the insulation cover 101, is exposed from the surface 41 of the liquid resin filler 40, i.e. is not covered by the liquid resin filler 40. Then, the liquid resin filler 40 is hardened, so that the ignition coil 1 for spark plugs is completed.

After completion of the ignition coil 1, the head of a spark plug 50 is fitted to the second end of the tubular plug cap 32, so that the spring terminal 122 is pressed by the center electrode of the spark plug 50 while electrically connected to the center electrode of the spark plug 50. This completes attachment of the ignition coil 1 to the spark plug 50 while electrical connection between the ignition coil 1 and the spark plug 50 is securely established.

As described above, the process of demolding the hardened component using the ejector pins $P_{EJT}$ results in the ejector-pin mark, i.e. the ejector-pin dent, 102 being formed on a position of the C-shaped longitudinal side surface 101b1; the position of the C-shaped longitudinal side surface 101b1 is pushed by the end of the corresponding ejector pin $P_{EJT}$. In addition, the injecting process using the gate G results in the gate-mark opposite portion 103a of the bottom surface 101c of the insulation cover 101, which is opposite to the gate mark 103, being formed.

However, the ignition coil 1 according to the first embodiment is configured such that the ejector-pin mark 102 and the gate-mark opposite portion 103a are completely covered with the resin filler 40, in other words, are completely sealed by the resin filler 40. This prevents the ejector-pin mark 102 and the gate-mark opposite portion 103a from being close to the surface 41 of the resin filler 40, and reinforces locally weak portions of the insulation cover 101 matching with the ejector-pin mark 102 and the gate-mark opposite portion 103a. This results in:

reduction of the occurrence of cracks in the insulation cover 101 due to the ejector-pin mark 102 and a weld line WL formed at or around the gate-mark opposite portion 103a;

prevention of the entrance of moisture into at least one crack even if the at least one crack occurs at the position of the eject-pin mark 102 and/or the gate-mark opposite portion 103a of the insulation cover 101; and prevention of the progress of at least one crack even if the at least one crack occurs at the position of the eject-pin mark 102 and/or the gate-mark opposite portion 103a of the insulation cover 101.

Second Embodiment

An ignition coil 1A according to a second embodiment of the present disclosure will be described with reference to FIGS. 4A to 6D.

The structure and/or functions of the ignition coil 1A according to the second embodiment are different from those of the ignition coil 1 by the following points. So, the different points will be mainly described hereinafter, and therefore, redundant descriptions of like parts between the embodiments, to which like reference characters are assigned, are omitted or simplified.

Figure 4A:
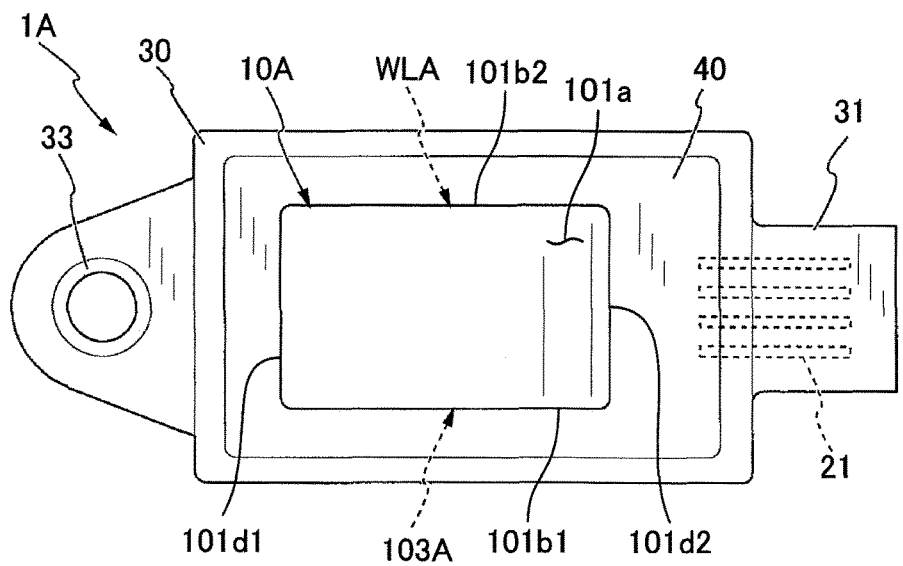
FIG. 4A is a schematic top view of an ignition coil according to a second embodiment of the present disclosure.
Figure 4B:
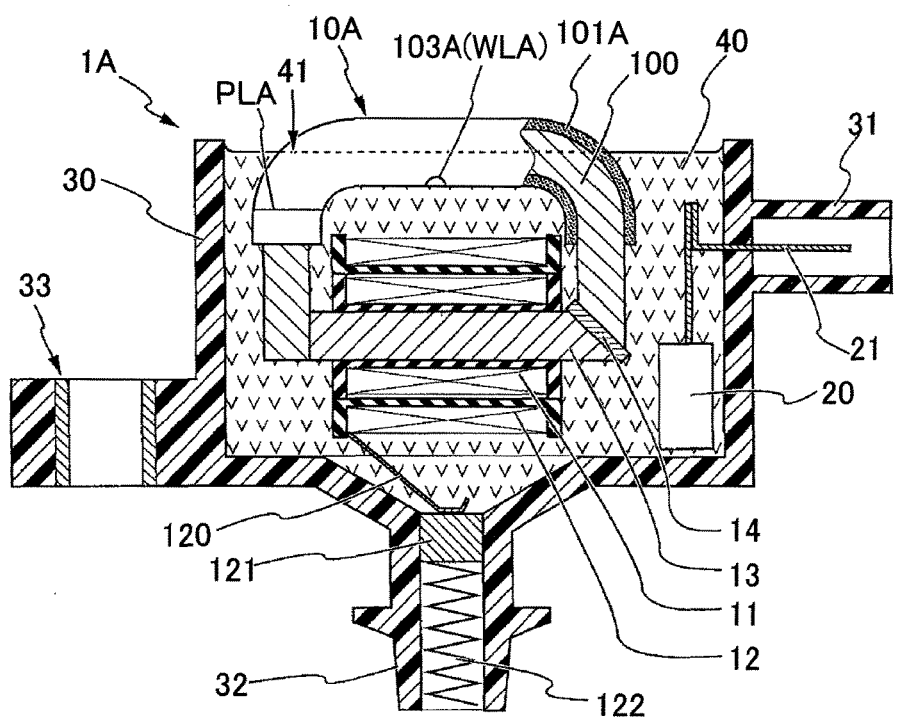
FIG. 4B is a longitudinal cross section of the ignition coil illustrated in FIG. 4A.
Figure 5A:
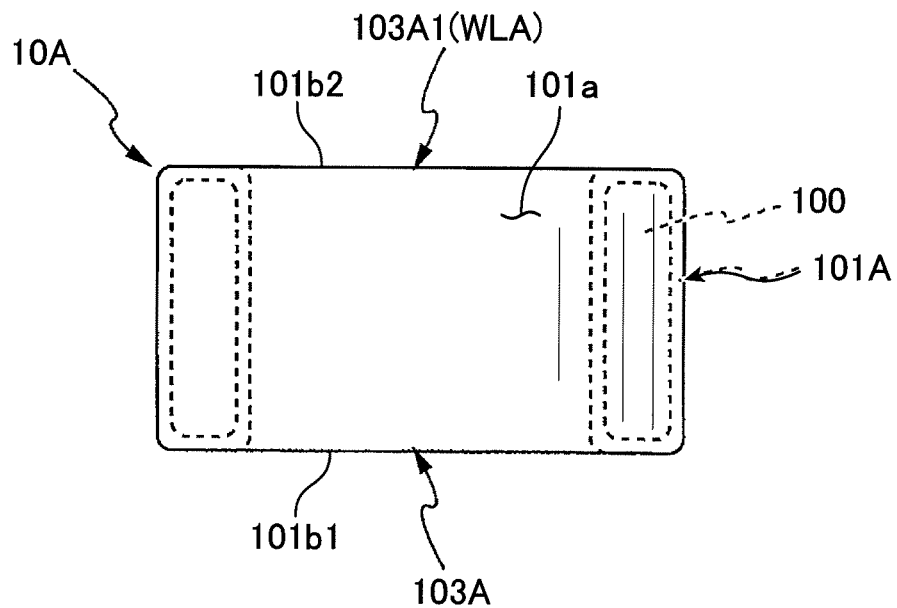
FIG. 5A is a schematic top view of a molded side-core assembly of the ignition coil according to the second embodiment.
Figure 5B:
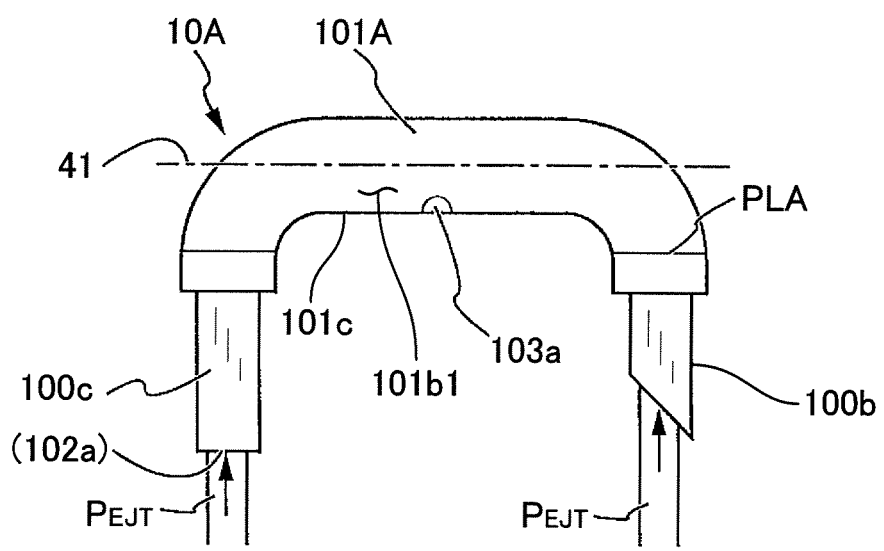
FIG. 5B is a longitudinal side view of the molded side-core assembly of the ignition coil according to the second embodiment.

As illustrated in FIGS. 4A and 5A, no ejector-pin marks 102A are formed on the surface of an insulation cover 101A of a molded side-core assembly 10A. In contrast, as illustrated in FIGS. 5A to 5D, a gate mark 103A is formed on a lower portion of one C-shaped longitudinal side surface 101b1 of an insulation cover 101A. Thus, a gate-mark opposite portion 103A1 is formed on a corresponding lower portion of the other C-shaped longitudinal side surface 101b2 of the insulation cover 101A.

Specially, the ignition coil 1A according to the second embodiment is configured such that the gate mark 103A and the gate-mark opposite portion 103A1 are embedded in the resin filler 40. A weld-line WLA may be formed at or around, for example, the gate-mark opposite portion 103A1.

Next, a specific method of manufacturing the molded side-core assembly 10A of the ignition coil 1A will be described hereinafter with reference to FIGS. 6A to 6D. Because the manufacturing method according to the second embodiment is similar to that according to the first embodiment, different points therebetween will be described hereinafter.

Figure 6A:
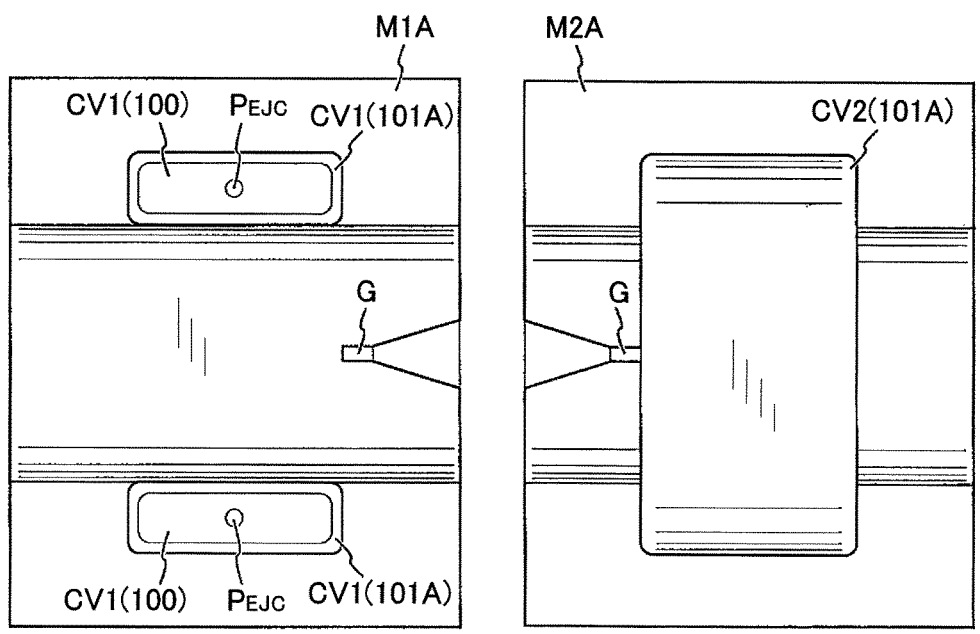
FIG. 6A is a plan view schematically illustrating a pair of first and second mold segments of a mold used for manufacturing the molded side-core assembly according to the second embodiment.

FIG. 6A schematically illustrates a pair of first and second mold segments M1A and M2A of a mold MA while the mold MA is opened at a parting plane, i.e. a parting line, PLA described later, so that the first and second mold segments M1A and M2A are separated from each other.

Each of the first and second mold segments M1A and M2A has a substantially rectangular parallelepiped shape.

The first mold segment M1A has first and second cavities CV1(100) and CV2(100) formed therein. The first cavity CV1(100) of the first segment M1 matches with the leg 100b of the arched side core 100, and the second cavity CV2(100) of the first segment M1 matches with the leg 100c of the arched side core 100.

The first mold segment M1A also has third cavities CV1(101A) formed therein and communicating with the respective first and second cavities CV1(100) and CV2(100). The shape of each of the third cavities CV1(101A) is identical to the shape of a corresponding end of the C-shaped insulation cover 101A.

The second mold segment M2A has a fourth cavity CV2(101A) formed therein. The shape of the fourth cavity CV2(101A) is identical to the shape of the remaining part of the insulation cover 101A except for the respective ends.

Figure 6B:
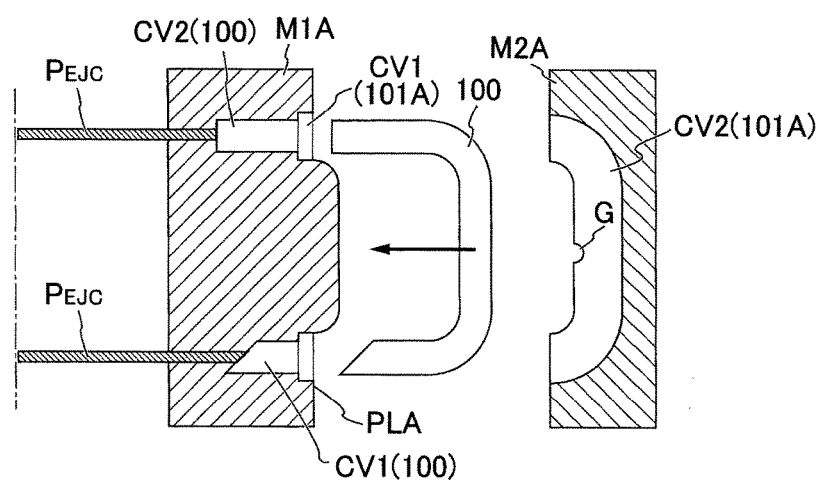
FIG. 6B is a longitudinal cross sectional view of each of the first and second mold segments illustrating how an arched side core is inserted into a cavity of each of the first and second mold segments according to the second embodiment.

Specifically, the method according to the second embodiment opens the closed mold MA at the parting plane, i.e. parting line, PLA that crosses the closed mold MA along the lateral direction of the insulation cover 101A, i.e. crosses the closed mold MA in parallel to the plurality of C-shaped thin silicon-steel plates of the side core 100 (see FIG. 6B).

When the first and second mold segments M1A and M2A are closed to constitute the mold MA, a gate, i.e. an orifice, G is formed to face a portion of the fourth cavity CV2(101A); the portion corresponds to the lower portion of the C-shaped longitudinal side surface 101b1 of the insulation cover 101A.

Specifically, an assembled cavity based on the first and second cavities CV1(100) and CV2 (100), the third cavities CV1(101A), and the fourth cavities CV2(101A) when the first and second mold segments M1A and M2A are closed matches in shape with the molded side-core assembly 10A to be manufactured.

For example, first and second ejector-pin holes are formed through the first mold segment M1A. The first ejector-pin hole communicates with the first cavity CV1(100), and is located to face a portion of the first cavity CV1(100) matching with the leg 100b of the C-shaped longitudinal side core 100. Similarly, the second ejector-pin hole communicates with the second cavity CV2(100), and is located to face a portion of the second cavity CV2(100) matching with the leg 100c of the arched side core 100.

In each of the first and second ejector-pin holes, an ejector pin $P_{EJT}$ is inserted such that an end of the ejector pin $P_{EJT}$ is flush with the inner periphery of a corresponding cavity for removal of the molded side-core assembly 10 from the first mold segment M1A.

As illustrated in FIG. 6B, the legs 100b and 100c of the arched side core 100 are fitted in the respective first and second cavities CV1(100) CV2(100) of the first mold segment M1A and the third cavities CV1(101A) of the first mold segment M1A. Thereafter, the second mold segment M2A is mounted on the first mold segment M1A at their parting lines PLA so that the columnar base 100a is inserted in the fourth cavity CV2(101A) of the second mold segment M2A (see FIGS. 6B and 6C).

Figure 6C:
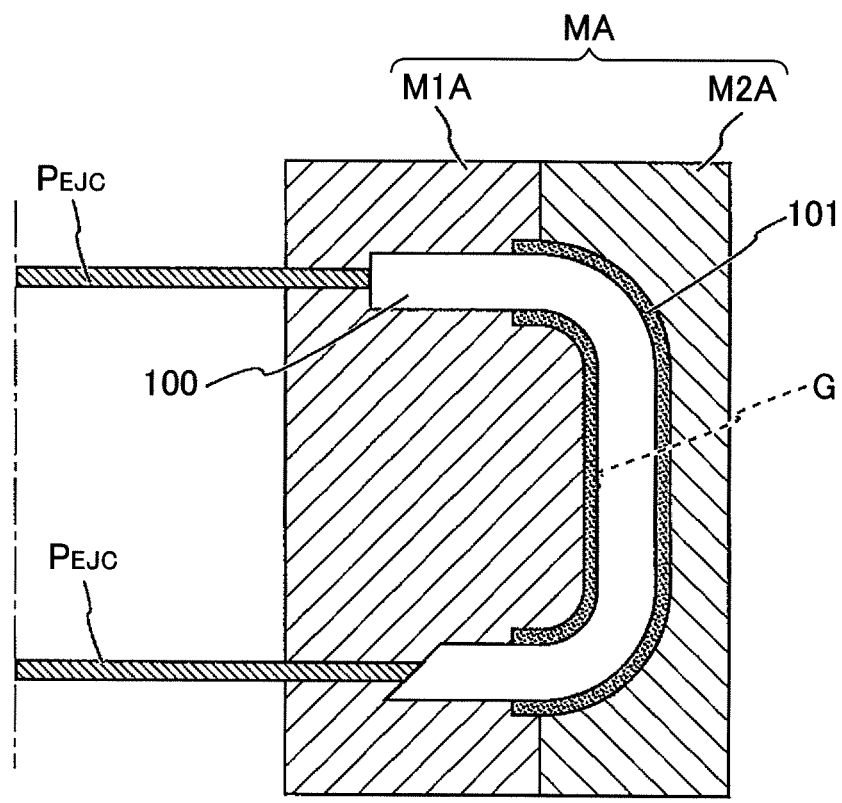
FIG. 6C is a longitudinal cross sectional view of the first and second mold segments that are closed illustrating how molten resin is injected to the cavity of the closed first and second mold segments according to the second embodiment.
Figure 6D:
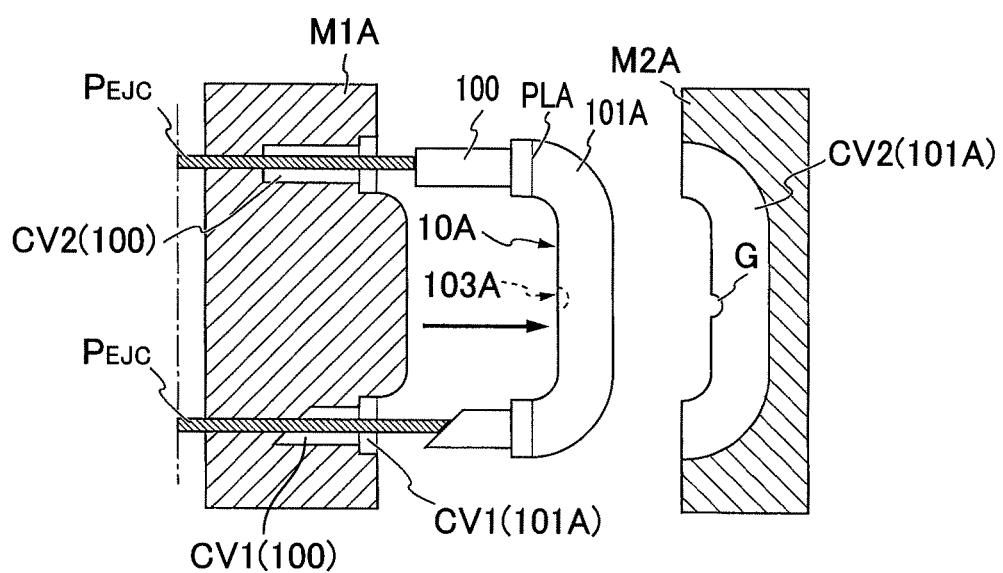
FIG. 6D is a longitudinal cross sectional view of each of the first and second mold segments illustrating how a hardened component in the cavity of the closed first and second mold segments is removed from the first and second mold segments using ejector pins according to the second embodiment.

Then, as illustrated in FIG. 6C, molten insulation resin RSN is injected into the third cavities CV1(101A) and the fourth cavity CV2(101A) through the gate G.

Upon cooling after the injection, the injected resin RSN is hardened. Then, the first and second mold segments M1A and M2A are opened at the parting plane (parting line) PL. Thereafter, the ejector pins $P_{EJT}$ are driven forward to push the respective legs 100b and 100c of the arched side core 100 of the hardened component in the first, second, third, and fourth cavities CV1(100), CV2(100), CV1(101A), and CV2(101A). This demolds the hardened component as the molded side-core assembly 10A.

As described above, the injecting process using the gate G results in the gate mark 103A and the gate-mark opposite portion 103A1 respectively formed on the C-shaped longitudinal side surfaces 101b1 and 101b2 of the insulation cover 101A.

However, the ignition coil 1A according to the second embodiment is configured such that the gate mark 103A and the gate-mark opposite portion 103A1 are completely covered with the resin filler 40, in other words, are completely sealed by the resin filler 40. This reinforces locally weak portions of the insulation cover 101A matching with the gate mark 103A and the gate-mark opposite portion 103A1. This results in:

reduction of the occurrence of cracks in the insulation cover 101A due to the gate mark 103A and a weld line WLA formed at or around the gate-mark opposite portion 103A1;

prevention of the entrance of moisture into at least one crack even if the at least one crack occurs at the position of the gate mark 103A and/or the gate-mark opposite portion 103A1 of the insulation cover 101A; and prevention of the progress of at least one crack even if the at least one crack occurs at the position of the gate mark 103A and/or the gate-mark opposite portion 103A1 of the insulation cover 101A.

Note that, during the demolding process, the ejector pins $P_{EJT}$ are driven forward to push the respective legs 100b and 100c of the arched side core 100. Because the surfaces of the legs 100b and 100c of the arched side core 100 are hard, no ejector-pin marks 102A are formed on the surfaces of the legs 100b and 100c of the arched side core 100. This prevents internal stress from being focused on locally weak portions of the insulation cover 101A due to the ejector-pin marks 102A, making hard the occurrence of cracks in the insulation cover 101A and the resin filler 40. This therefore provides the ignition coil 1A having higher reliability.

Third Embodiment

An ignition coil 1B according to a third embodiment of the present disclosure will be described with reference to FIGS. 7A to 8B.

The structure and/or functions of the ignition coil 1B according to the third embodiment are different from those of the ignition coil 1 by the following points. So, the different points will be mainly described hereinafter, and therefore, redundant descriptions of like parts between the embodiments, to which like reference characters are assigned, are omitted or simplified.

Figure 7A:
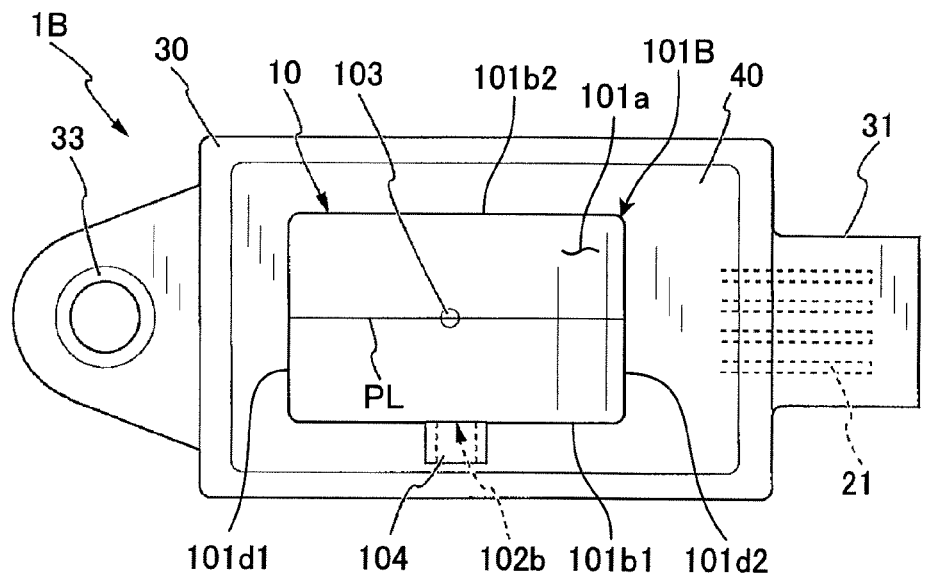
FIG. 7A is a schematic top view of an ignition coil according to a third embodiment of the present disclosure.
Figure 7B:
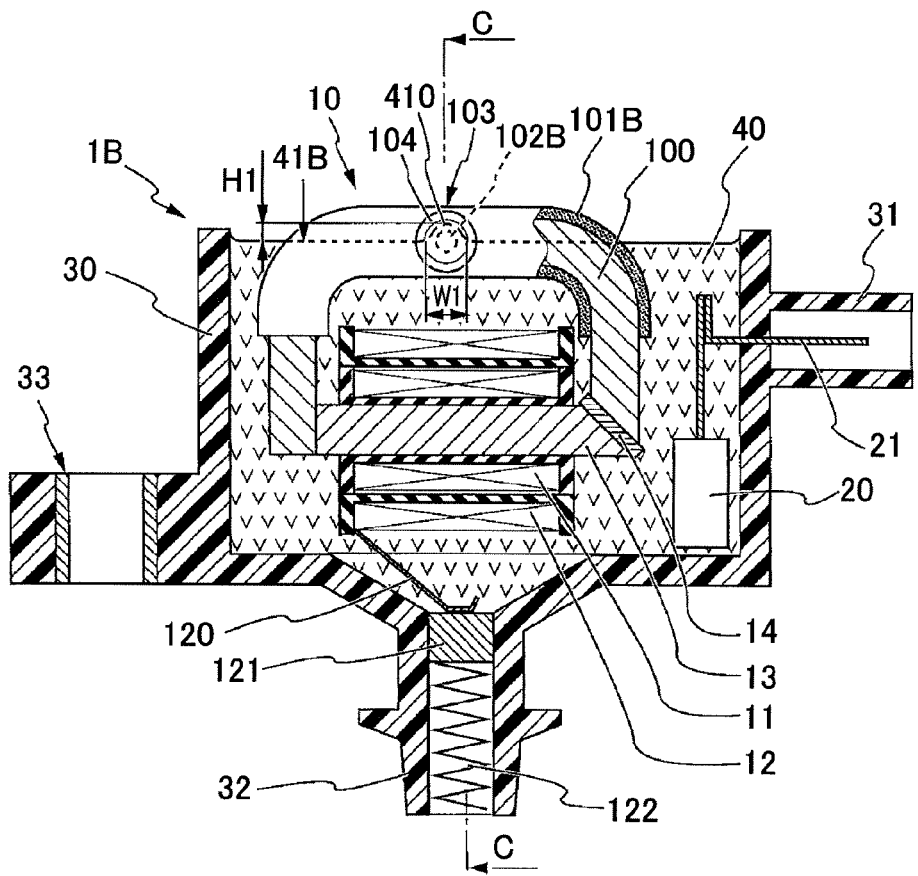
FIG. 7B is a longitudinal cross section of the ignition coil illustrated in FIG. 7A.
Figure 7C:
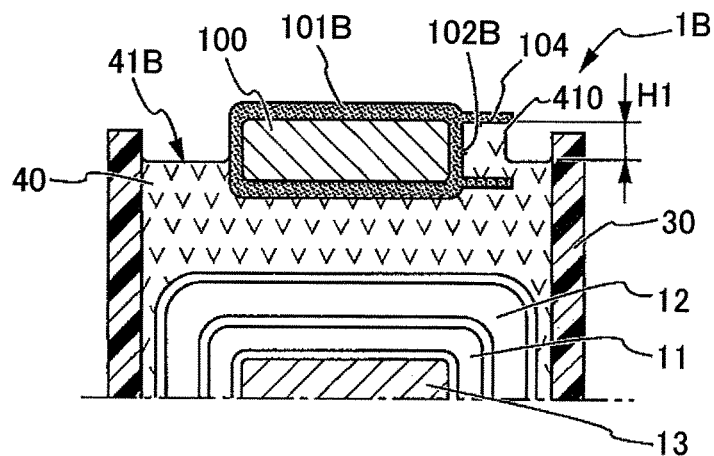
FIG. 7C is a lateral cross section of the ignition coil illustrated in FIG. 7A.

As illustrated in FIGS. 7A to 7C, an ejector-pin mark 102B is formed on one C-shaped longitudinal side surface 101b1 of an insulation cover 101B of a molded side-core assembly 10B. In the third embodiment, a part of the elector-pin mark 102B is exposed from the surface 41B of the resin filler 40 filled in the inner chamber of the case 30a.

The ignition coil 1B according to the third embodiment is configured such that a protrusion holder 104 is formed on the C-shaped longitudinal side surface 101b1 to perpendicularly protrude from the surface 101b1. The protrusion holder 104 has a substantially cylindrical shape, and surrounds the ejector-pin mark 102B. An end of the protrusion 104 in its axial direction opens, and the opening end of the protrusion 104 faces the surface 41B of the resin filler 40. The protrusion holder 104 has resistance to tensile stress, and serves as a crack preventing means to enclose the ejection-pin mark 102B.

Because the opening end of the protrusion holder 104 faces the surface 41B of the resin filler 40 filled in the inner chamber of the case 30a, capillary action causes part of the resin filler 40 to be pulled into the protrusion holder 104, so that the protrusion holder 104 holds therein part of the resin filler 40. This forms a resin seal member 410 that completely seals the ejector-pin mark 102B within the protrusion 104, thus preventing external water from contacting the ejector-pin mark 102B.

Specifically, the protrusion holder 104 has a cylindrical shape, and has a circular cross section with an inner diameter W1; the circular cross section is greater than the size of the ejector-pin mark 102B. Referring to FIG. 7C, the highest position of the inner peripheral surface of the protrusion 104 with respect to the surface 41B of the resin filler 40 outside the protrusion holder 104 is set within a preset height H1. In order to pull part of the resin filler 40 into the protrusion holder 104 efficiently using capillary action, the height H1 is preferably set to approximately 2 mm.

It is also preferable that the inner diameter W1 is set to be within 4 mm. If the inner diameter W1 was set to be greater than 4 mm, the pulling force of a part of the resin filler 40 based on capillary action might be reduced.

As described above, the opening end of the protrusion holder 104 faces the surface 41B of the resin filler 40 outside the protrusion holder 104. In other words, the lowest position of the inner peripheral surface of the protrusion holder 104 is set to be lower than the surface 41B of the resin filler 40 outside the protrusion holder 104. This allows part of the resin filler 40 to flow into the protrusion holder 104.

There are several modifications of the protrusion holder 104.

Figure 7D:
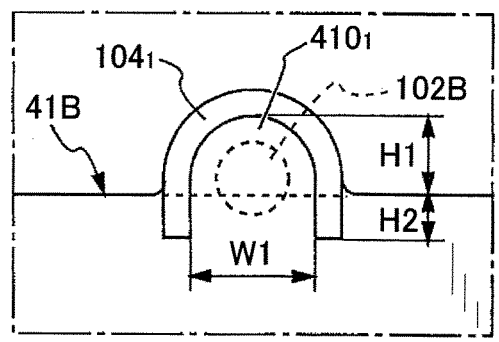
FIG. 7D is an enlarged view of a protrusion according to a modification of a protrusion illustrated in FIGS. 7A to 7C according to the third embodiment.

FIG. 7D schematically illustrates a U-shaped protrusion holder $104_1$ formed on the C-shaped longitudinal side surface 101b1 to perpendicularly protrude from the surface 101b1. The U-shaped protrusion holder $104_1$ has a substantially U-shape, and surrounds the ejector-pin mark 102B while opening a lower portion between both ends of the U-shaped protrusion holder $104_1$. That is, the U-shaped protrusion holder $104_1$ communicates with the resin filler 40 via the lower opening portion. An end of the U-shaped protrusion holder $104_1$ in the perpendicular direction to the C-shaped longitudinal side surface 101b1 can open or close.

The highest position of the inner peripheral surface of the U-shaped protrusion holder $104_1$ with respect to the surface 41B of the resin filler 40 is set within the preset height H1 of approximately 2 mm.

The lowest position of each end of the U-shaped protrusion holder $104_1$ is set to be lower than the surface 41B of the resin filler 40 outside the U-shaped protrusion holder $104_1$ by a given length H2. This allows part of the resin filler 40 to flow into the U-shaped protrusion holder $104_1$ using capillary action.

Because the U-shaped protrusion holder $104_1$ is partially filled in the resin filler 40 filled in the inner chamber of the case 30a outside the U-shaped protrusion holder $104_1$, capillary action causes part of the resin filler 40 to be pulled into the U-shaped protrusion holder $104_1$. This results in the U-shaped protrusion holder $104_1$ holding therein part of the resin filler 40. This forms a resin seal member 410 that completely seals the ejector-pin mark 102B within the U-shaped protrusion $104_1$, thus preventing external water from contacting the ejector-pin mark 102B.

Figure 7E:
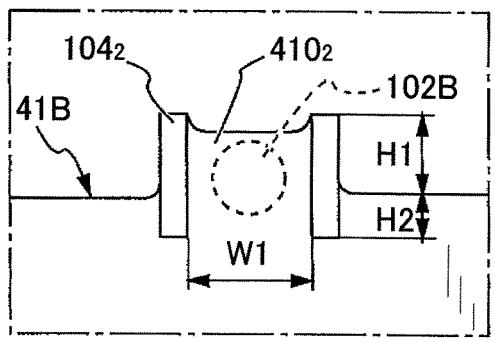
FIG. 7E is an enlarged view of a protrusion according to another modification of the protrusion illustrated in FIGS. 7A to 7C according to the third embodiment.

FIG. 7E schematically illustrates, as a protrusion holder, a pair of parallel plate protrusions $104_2$ formed on the C-shaped longitudinal side surface 101b1 to perpendicularly protrude from the surface 101b1. The plate protrusions $104_2$ are separated from each other by an interval W1 in a direction parallel to the surface 41B of the resin filler 41. The plate protrusions $104_2$ sandwich the ejector-pin mark 102B while communicating with the resin filler 40 via the space between the bottom ends of the respective plate protrusions $104_2$.

The interval W1 is preferably set to be within 4 mm. The highest ends of the respective plate protrusions $104_2$ with respect to the surface 41B of the resin filler 40 are set within the preset height H1 of approximately 2 mm. The lowest ends of the respective plate protrusions $104_2$ are set to be lower than the surface 41B of the resin filler 40 by a given length H2. This allows part of the resin filler 40 to flow into the space of the plate protrusions $104_2$ using capillary action.

Because the plate protrusions $104_2$ are partially filled in the resin filler 40 filled in the inner chamber of the case 30a, capillary action causes part of the resin filler 40 to be pulled into the space between the plate protrusions $104_2$. This results in the space between the plate protrusions $104_2$ being filled with the resin filler 40. This forms a resin seal member 410 that completely seals the ejector-pin mark 102B within the space between the plate protrusions $104_2$, thus preventing external water from contacting the ejector-pin mark 102B.

Figure 7F:
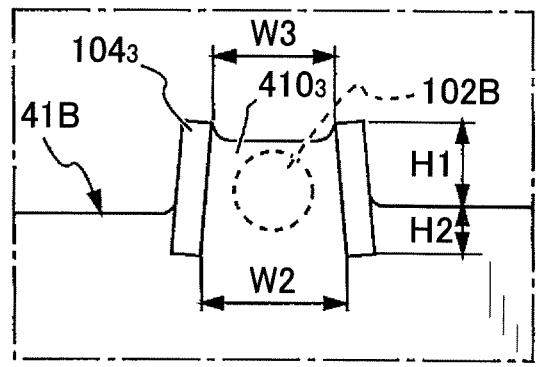
FIG. 7F is an enlarged view of a protrusion according to a further modification of the protrusion illustrated in FIGS. 7A to 7C according to the third embodiment.

FIG. 7F schematically illustrates, as a protrusion holder, a pair of plate protrusions $104_3$ formed on the C-shaped longitudinal side surface 101b1 to perpendicularly protrude from the surface 101b1. The inner edge of a top end of one of the plate protrusions $104_3$ is separated from the inner edge of a top end of the other of the plate protrusions $104_3$ by a distance W2 in their opposing direction parallel to the surface 41B of the rein filler 41. The inner edge of a bottom end of one of the plate protrusions $104_3$ is separated from the inner edge of a bottom end of the other of the plate protrusions $104_3$ by a distance W3 in their opposing direction parallel to the surface 41B of the rein filler 41. The distance W3 is set to be longer than the distance W2. That is, the plate protrusions $104_3$ are tapered from their bottom side filled in the resin filler 40 to their top side that is exposed from the resin filler 40. Preferably, the distance W3 is longer than the interval W1 set forth above, and the distance W2 is shorter than the interval W1.

The plate protrusions $104_3$ sandwich the ejector-pin mark 102B while communicating with the resin filler 40 via the space between the bottom ends of the respective plate protrusions $104_3$. The plate protrusions $104_3$ are tapered from their bottom side filled in the resin filler 40 to their top side that is exposed from the resin filler 40, resulting in higher pulling force based on capillary action. This therefore reliably pulls a part of the resin filler 40 into the space between the plate protrusions $104_3$. This results in the space between the plate protrusions $104_3$ being filled with the resin filler 40. This forms a resin seal member 410 that completely seals the ejector-pin mark 102B within the space between the plate protrusions $104_3$, thus preventing external water from contacting to the ejector-pin mark 102B.

In this modification illustrated in FIG. 7F, the highest ends of the respective plate protrusions $104_3$ with respect to the surface 41B of the resin filler 40 are set within the preset height H1 of approximately 2 mm. The lowest ends of the respective plate protrusions $104_3$ are set to be lower than the surface 41B of the resin filler 40 by a given length H2. This allows part of the resin filler 40 to flow into the space of the plate protrusions $104_3$ using capillary action.

Figure 3D:
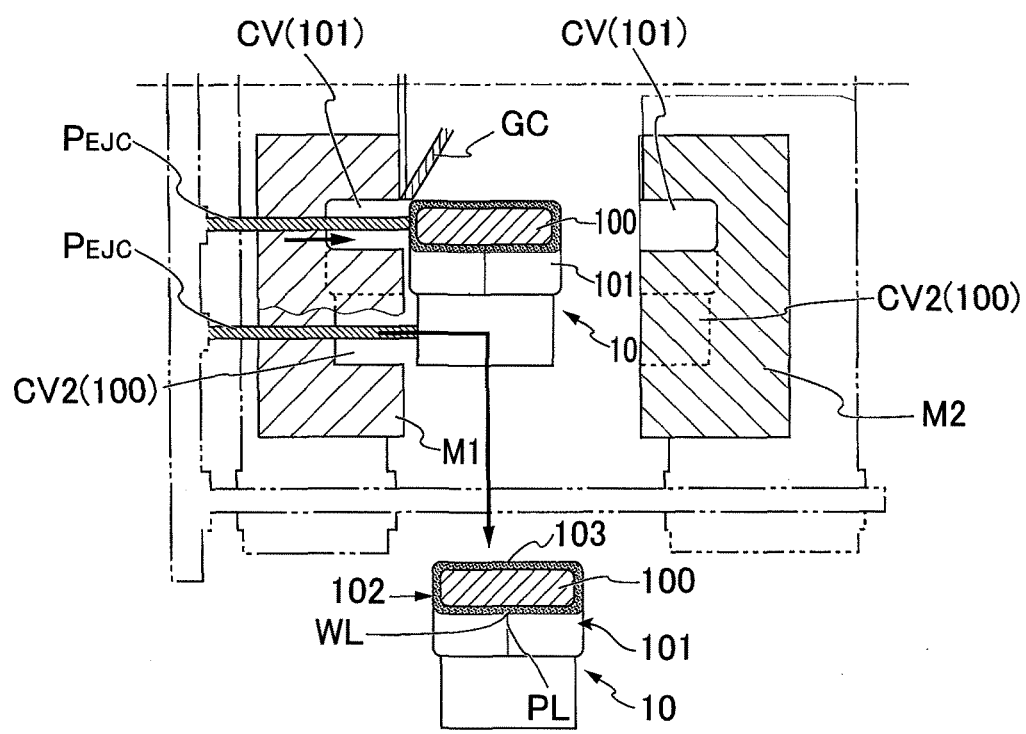
FIG. 3D is a cross sectional view, taken across line A-A of FIG. 3A, illustrating how a hardened component in the cavity of the closed first and second mold segments is removed from the first and second mold segments using ejector pins according to the first embodiment.

Next, how to form the protrusion holder 104 on the C-shaped longitudinal side surface 101b1 of the insulation cover 101B will be described hereinafter with reference to FIGS. 8A and 8B corresponding to FIGS. 3C and 3D according to the first embodiment.

In each of FIGS. 8A and 8B, a first mold segment M1B is different from the first mold segment M1 in the following points. Specifically, a cylindrical cavity CV(104), which is identical in shape to the cylindrical protrusion holder 104, is so formed in the first mold segment M1B around an end of the first ejector-pin hole as to communicate with the third cavity CV(101). The end of the first ejector-pin hole faces a portion of the third cavity CV(101) matching with the C-shaped longitudinal side surface 101b1 of the insulation cover 101.

Figure 8A:
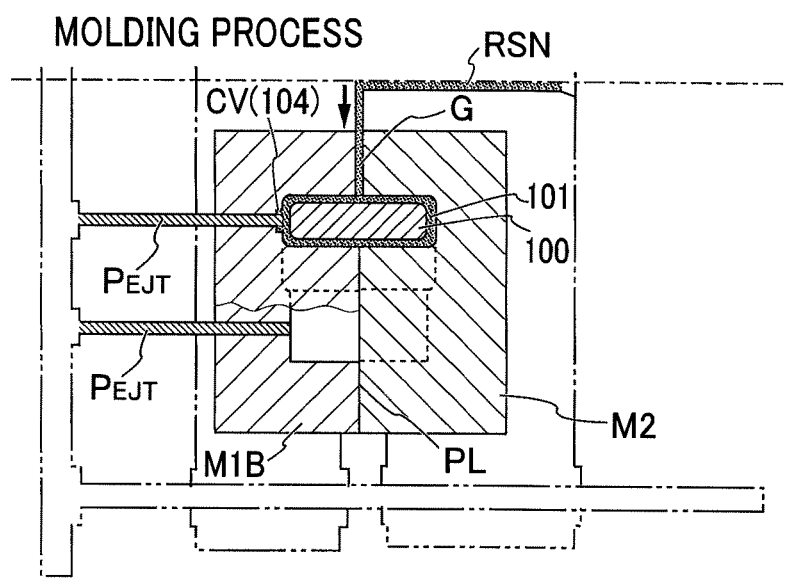
FIG. 8A is a cross sectional view corresponding to FIG. 3C illustrating how molten resin is injected to the cavity of first and second mold segments that are closed according to the third embodiment.
Figure 8B:
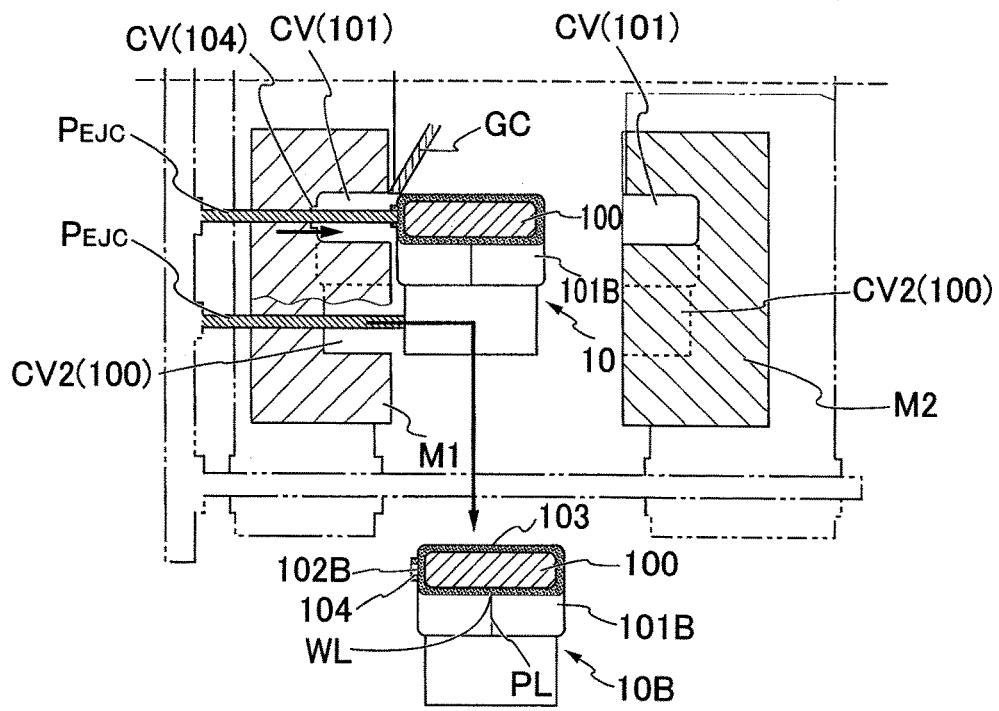
FIG. 8B is a cross sectional view corresponding to FIG. 3D illustrating how a hardened component in the cavity of the closed first and second mold segments is removed from the first and second mold segments using ejector pins according to the third embodiment.

Thus, as illustrated in FIG. 8A, molten insulation resin RSN is injected into the third cavity CV(101) of the closed first and second mold segments M1B and M2B through the gate G, making it possible to integrally form the protrusion holder 104 together with the insulation cover 101B.

Note that method according to the third embodiment opens the closed mold M at the parting plane, i.e. parting line, PL, that crosses the closed mold M along the longitudinal direction of the side core 100, i.e. crosses perpendicularly all the stacked C-shaped thin silicon-steel plates of the side core 100 (see FIG. 8A).

However, the third embodiment can open the closed mold M at the parting plane, i.e. parting line, PLA that crosses the closed mold MA along the lateral direction of the insulation cover 101B, i.e. crosses the closed mold M in parallel to the plurality of C-shaped thin silicon-steel plates of the side core 100.

Specifically, as a modification of the third embodiment based on the ignition coil 10A according to the second embodiment, a protrusion holder 104 can be formed on at least one of:

the bottom surface 101c of the insulation cover 101B to perpendicularly protrude from the surface 101c and surround the gate-mark opposite portion 103a; and the top surface 101a of the insulation cover 101B to perpendicularly protrude from the surface 101a and surround the gate mark 103.

As described above, during the injection process, a weld line and/or a void may be formed on or around either the position of the gate mark 103 on the top surface 101a or the position of the gate-mark opposite portion 103a on the bottom surface 101c. This is because the meeting of two or more flows of the injected resin or the rapid change of flow of the injected resin occurs at or around the position of the gate mark 103a or the gate-mark opposite portion 103a.

Thus, the ignition coil 1B according to the modification of the third embodiment is configured such that the protrusion holder 104 mechanically reinforces locally weak portions of the insulation cover 101B matching with the gate mark 103 and the gate-mark opposite portion 103a. This further improves the durability of the ignition coil 1B against an addition of external impact to the locally weak portions of the insulation cover 101B, and against change in thermal stress in the insulation cover 101B.

As described above, it is preferable that the protrusion holder 104 has a substantially cylindrical shape in view of improvement of mechanical strength of the insulation cover 10B (see FIGS. 7A to 7C). However, if it was difficult to demold the hardened component in the mold M due to the existence of the cylindrical protrusion holder 104, it could be possible for a protrusion holder 104 to have a U-shaped shape (see FIG. 7D) or an ellipsoidal shape. A pair of plate protrusions (see FIG. 7E or FIG. 7F) formed to sandwich at least one of the gate mark 103 and the gate-mark opposite portion 103a on a corresponding surface of the insulation cover 101B (see FIGS. 7E and 7F).

When a protrusion holder 104 is formed to surround the gate-mark opposite portion 103a on the bottom surface 101c of the insulation cover 101B, it is preferable that the protrusion holder 104 blocks the extending direction of a weld line. This prevents the progress of any crack due to the weld line WL, thus further improving the reliability of the ignition coil 1B.

Fourth Embodiment

An ignition coil 1C according to a fourth embodiment of the present disclosure will be described with reference to FIGS. 9A to 10B.

The structure and/or functions of the ignition coil 1C according to the fourth embodiment are different from those of the ignition coil 1 by the following points. So, the different points will be mainly described hereinafter, and therefore, redundant descriptions of like parts between the embodiments, to which like reference characters are assigned, are omitted or simplified.

Figure 9A:
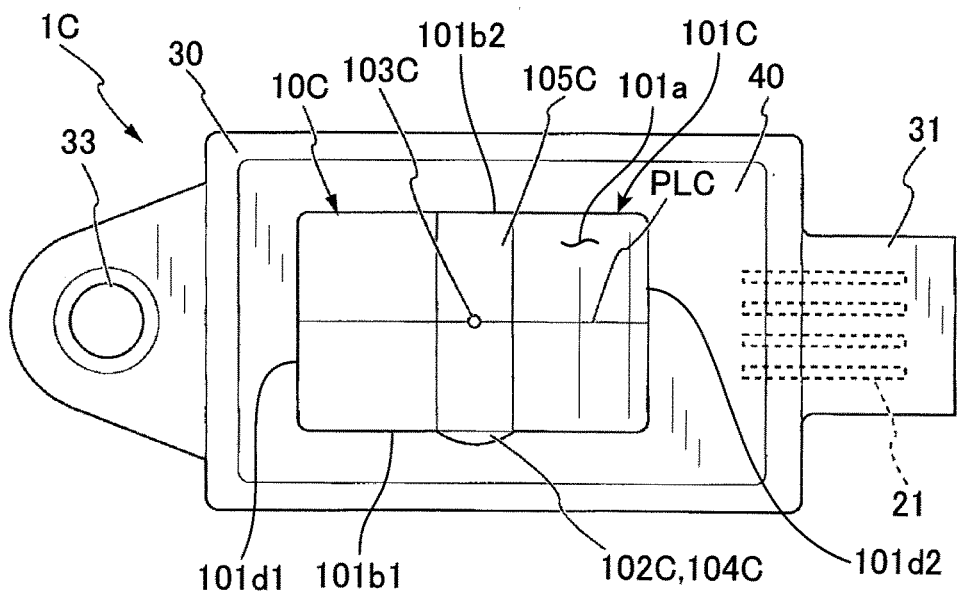
FIG. 9A is a schematic top view of an ignition coil according to a fourth embodiment of the present disclosure.
Figure 9B:
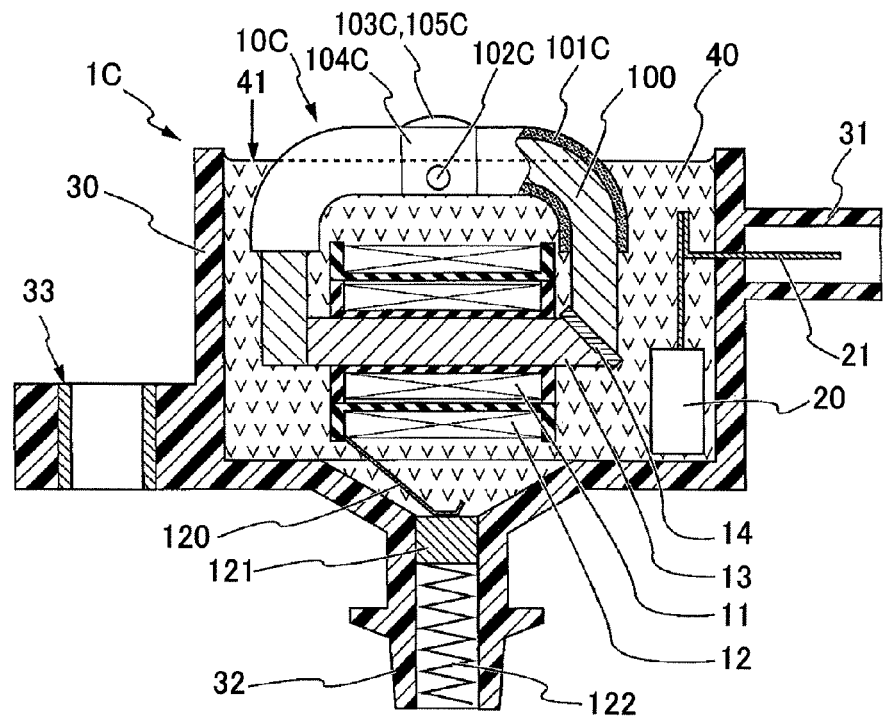
FIG. 9B is a longitudinal cross section of the ignition coil illustrated in FIG. 9A.

As illustrated in FIGS. 9A and 9B, an ejector-pin mark 102C is formed on one C-shaped longitudinal side surface 101b1 of an insulation cover 101C of a molded side-core assembly 10C. In addition, a gate mark 103C is formed at a substantially center position of the top surface 101a of an insulation cover 101C.

The ignition coil 1C according to the fourth embodiment is configured such that a portion of the insulation cover 101C at which the ejector-pin mark 102C is included is convexly bulged in a perpendicular direction to the C-shaped longitudinal side surface 101b1 to have a bulged portion 104C of the insulation cover 101C. The bulged portion 104C of the insulation cover 101C has a lateral width thicker than that of another portion of the insulation cover 101C.

Similarly, the ignition coil 1C is configured such that a portion of the insulation cover 101C at which the gate mark 103C is included is convexly bulged in a perpendicular direction to the top surface 101a to have a bulged portion 105C of the insulation cover 101C. The bulged portion 105C of the insulation cover 101C has a width in the perpendicular direction thicker than that of another portion of the insulation cover 101C.

Specifically, as illustrated in FIGS. 9A and 9B, a middle portion of the insulation cover 101C in the longitudinal direction of the insulation cover 101C, in which the ejector-pin mark 102C is included, is bulged to have the bulged portion 104C. Similarly, a middle portion of the insulation cover 101C in the longitudinal direction of the insulation cover 101C, in which the gate mark 103C is included, is bulged to have the bulged portion 105C.

Particularly, each of the bulged portions 104C and 105C is bulged to have a curved convex outer surface.

Figure 10A:
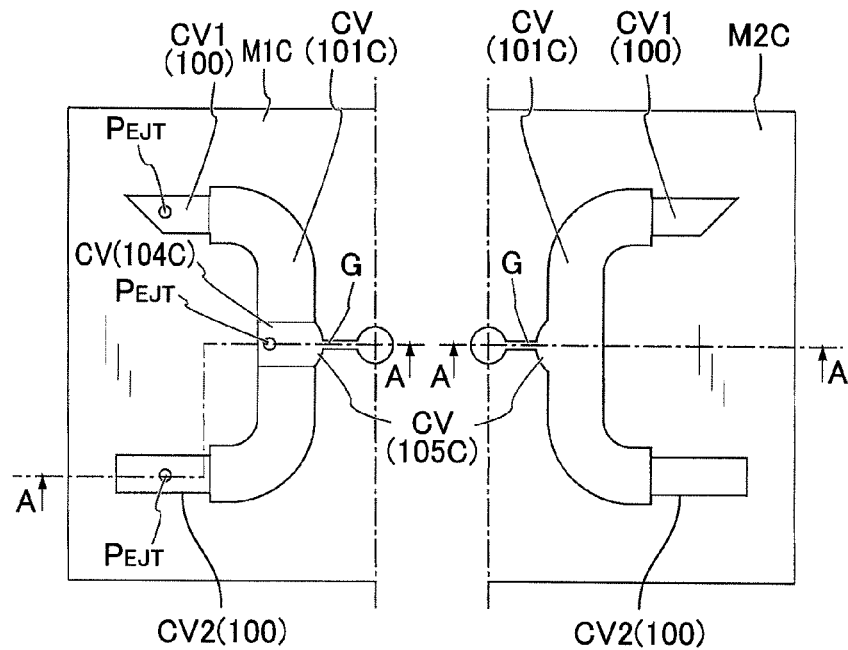
FIG. 10A is a plan view schematically illustrating a pair of first and second mold segments of a mold used for manufacturing the molded side-core assembly according to the fourth embodiment.

Next, how to form the bulged portions 104C and 105C of the insulation cover 101C will be described hereinafter with reference to FIGS. 10A and 10B corresponding to FIGS. 3A and 3C according to the first embodiment.

In each of FIGS. 10A and 10B, a first mold segment M1C is different from the first mold segment M1 in the following points. Specifically, a curved recess CV(104C), which is identical in shape to the bulged portion 104C, is formed at a first region of the inner periphery of the third cavity CV(101). The first region corresponds to the middle portion of the C-shaped longitudinal side surface 101b1 in the longitudinal direction of the surface 101b1, and includes an end of the first ejector-pin hole. The end of the first ejector-pin hole faces a portion of the third cavity CV(101) matching with the C-shaped longitudinal side surface 101b1 of the insulation cover 101.

A curved recess CV(105C) is also formed at a second region of the inner periphery of the third cavity CV(101) in each of the first mold segment M1C and a second mold segment M2C. The second region corresponds to the middle portion of the top surface 101a in the longitudinal direction of the top surface 101a, and includes the gate mark 103C.

Figure 10B:
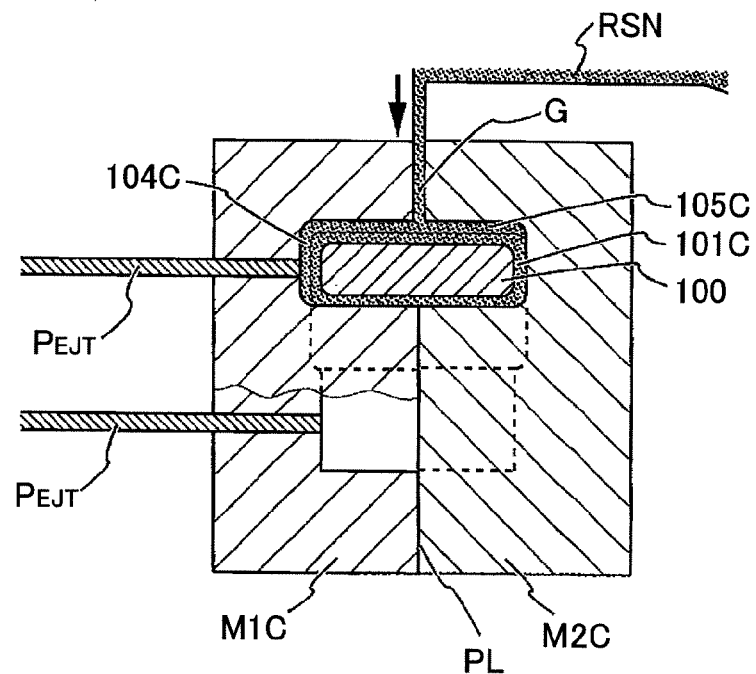
FIG. 10B is a cross sectional view, which is taken upon line A-A of FIG. 10A, illustrating how molten resin is injected to the cavity of the first and second mold segments that are closed according to the fourth embodiment.

Thus, as illustrated in FIG. 10B, molten insulation resin RSN is injected into the third cavity CV(101) of the first and second mold segments M1C and M2C through the gate G, making it possible to integrally form each of the bulged portions 104C and 105C together with the insulation cover 101C.

As described above, the ignition coil 1C according to the fourth embodiment is configured such that:

a portion of the insulation cover 101C at which the ejector-pin mark 102C is included is convexly bulged in the perpendicular direction to the C-shaped longitudinal side surface 101b1 to have the bulged portion 104C having the lateral width thicker than that of another portion of the insulation cover 101C; and a portion of the insulation cover 101C at which the gate mark 103C is included is convexly bulged in the perpendicular direction to the top surface 101a to have the bulged portion 105C having the width in the perpendicular direction thicker than that of another portion of the insulation cover 101C.

This mechanically reinforces the portion of the insulation cover 101C at which each of the ejector-pin mark 102C and the gate mark 103C is generated. This prevents the occurrence of a crack at the portion of the insulation cover 101C at which each of the ejector-pin mark 102C and the gate mark 103C is generated.

In addition, even if the ejector pin $P_{EJT}$ pushes the bulged portion 104C of the insulation cover 101C during the demolding process, the bulged portion 104C having the lateral width thicker than that of another portion of the insulation cover 101C maintains the mechanical strength thereof against the pressing force of the ejector pin $P_{EJT}$.

This therefore results in the ignition coil 1C having further higher reliability.

Particularly, each of the bulged portions 104C and 105C is bulged to have a curved convex outer surface, resulting in distribution of internal stress along the curved convex outer surface of each of the bulged portions 104C and 105C. This results in improvement of the durability of the ignition coil 1C.

A portion of the insulation cover 101C at which the gate-mark opposite portion is included can be convexly bulged in the perpendicular direction to the top surface 101a to have a bulged portion having the width in the perpendicular direction thicker than that of another portion of the insulation cover 101C.

At least one of the bulged portions 104C and 105C according to the fourth embodiment can be applied to the other embodiments.

Fifth Embodiment

Figure 11A:
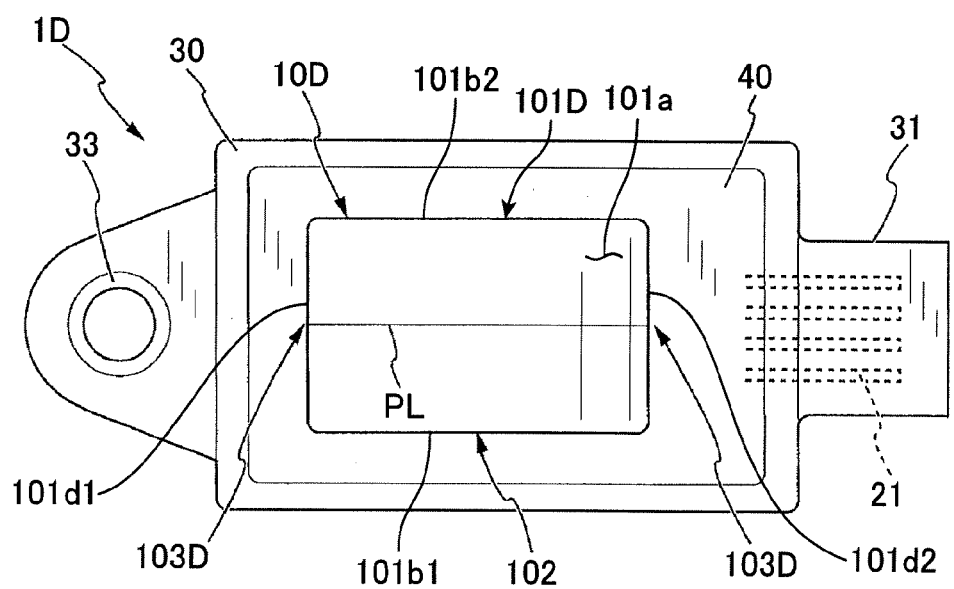
FIG. 11A is a schematic top view of an ignition coil according to a fifth embodiment of the present disclosure.
Figure 11B:
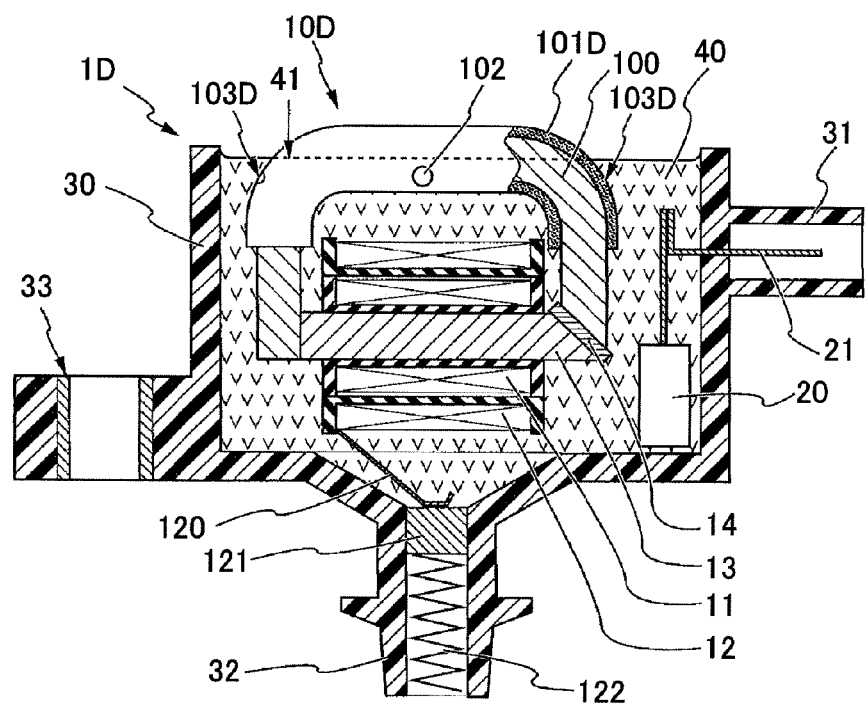
FIG. 11B is a longitudinal cross section of the ignition coil illustrated in FIG. 11A.

An ignition coil 1D according to a fifth embodiment of the present disclosure will be described with reference to FIGS. 11A and 11B.

The structure and/or functions of the ignition coil 1D according to the fifth embodiment are different from those of the ignition coil 1 by the following points. So, the different points will be mainly described hereinafter, and therefore, redundant descriptions of like parts between the embodiments, to which like reference characters are assigned, are omitted or simplified.

In the ignition coil 1D, a gate mark 103D is formed on one curved lateral side surface 101d1 of an insulation cover 101D, and located to be lower than the surface 41 of the resin filler 40. Specifically, the ignition coil 1D is configured such that the elector-pin mark 102 and the gate mark 103D of the insulation cover 101D are embedded in the resin filler 40.

This configuration prevents the ejector-pin mark 102 and the gate mark 103D from being close to the surface 41 of the resin filler 40, and reinforces locally weak portions of the insulation cover 101 matching with the ejector-pin mark 102 and the gate-mark 103D. This results in:

reduction of the occurrence of cracks in the insulation cover 101 due to the ejector-pin mark 102 and a weld line WL formed at or around the gate mark 103D;

prevention of the entrance of moisture into at least one crack even if the at least one crack occurs at the position of the eject-pin mark 102 and/or the gate mark 103D of the insulation cover 101D; and prevention of the progress of at least one crack even if the at least one crack occurs at the position of the eject-pin mark 102 and/or the gate mark 103D of the insulation cover 101D.

Sixth Embodiment

A specific method of manufacturing a molded side-core assembly 10E of an ignition coil 1E according to a sixth embodiment of the present disclosure will be described with reference to FIGS. 12A to 13B.

The structure and/or functions of the ignition coil 1E according to the sixth embodiment are different from those of the ignition coil 1 by the following points. So, the different points will be mainly described hereinafter, and therefore, redundant descriptions of like parts between the embodiments, to which like reference characters are assigned, are omitted or simplified.

Figure 12A:
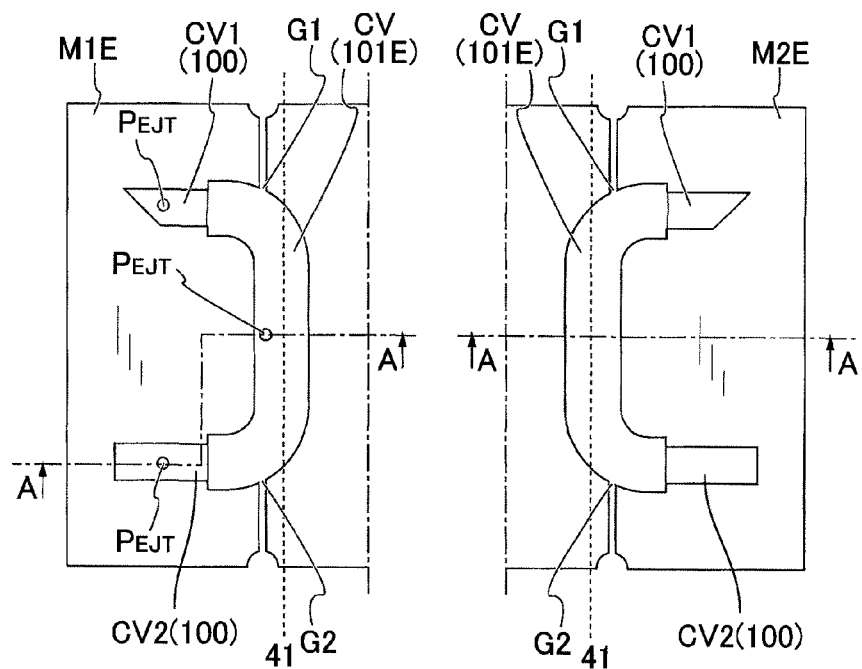
FIG. 12A is a plan view schematically illustrating a pair of first and second mold segments of a mold used for manufacturing a molded side-core assembly according to a sixth embodiment of the present disclosure.
Figure 12B:
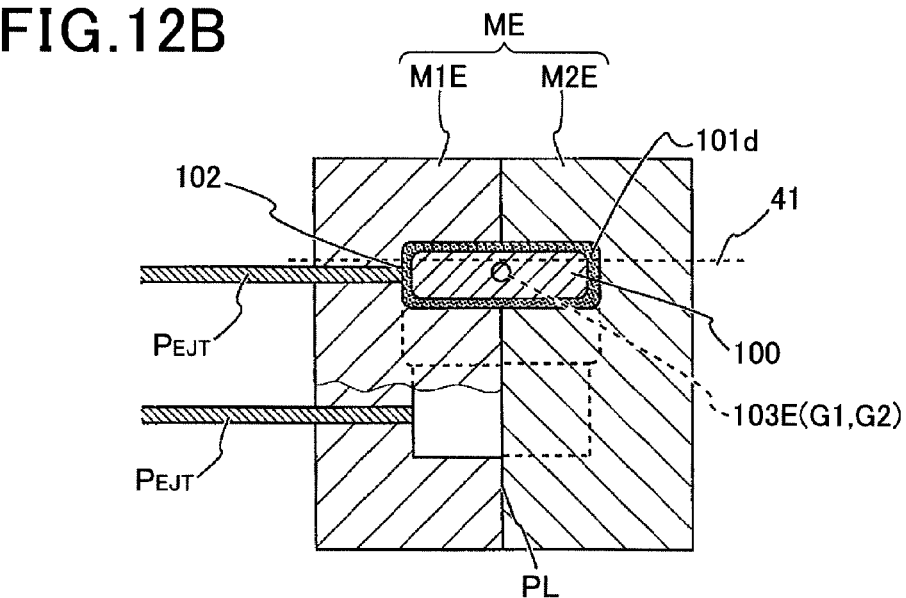
FIG. 12B is a cross sectional view, which is taken upon line A-A of FIG. 12A, illustrating how molten resin is injected to the cavity of the first and second mold segments that are closed according to the sixth embodiment.

FIG. 12A schematically illustrates a pair of first and second mold segments M1E and M2E of a mold ME while the mold ME is opened at a parting plane, i.e. a parting line, PL described later, so that the first and second mold segments M1E and M2E are separated from each other. Each of the first and second mold segments M1E and M2E has a substantially identical structure to that of a corresponding one of the first and second mold segments M1 and M2. So, the different points between each of the first and second mold segments M1E and M2E and a corresponding one of the first and second mold segments M1 and M2 will be mainly described hereinafter.

When the first and second mold segments M1E and M2E are closed to constitute the mold ME, each of first and second gates, i.e. first and second orifices, G1 and G2 is formed to face a portion of third cavities CV(101E) of the first and second segments M1E and M2E. Each of the first and second gates G1 and G2 serves as an entrance of the third cavities CV(101E) for injection of molten resin into the third cavities CV(101E). The portion of the third cavities CV(101E) that the first gate G1 faces corresponds to the lateral side surface 101d1 of the insulation cover 101. The portion of the third cavities CV(101E) that the second gate G2 faces corresponds to the lateral side surface 101d2 of the insulation cover 101. Thus, a gate mark 103E is formed on each of the lateral side surfaces 101d1 and 101d2 of the insulation cover 101. Like the fifth embodiment, the gate marks 103E on the respective lateral side surfaces 101d1 and 101d2 of the insulation cover 101 are embedded in the resin filler 40.

In each of the first to sixth embodiments, a corresponding ignition coil is configured to hermetically seal an ejector-pin mark 102; the ejector-pin mark 102 is formed on the surface of the insulation cover 101 during the process of pressing the surface of the insulation cover 101 by an ejector pin PEST to thereby demold the hardened component corresponding to the molded side-core assembly in the cavity.

Additionally, an ignition coil according to each embodiment can be configured to hermetically seal a holding-pin mark; the holding-pin mark is formed on the surface of the insulation cover 101 when a movable or stationary holding pin is used during the injection process.

Specifically, when injection of molten resin into the cavity CV(100) is started, the movable holding pin is driven forward to hold at its end the arched side core 100 inserted in the cavity CV(100). When the injection of molten resin is completed, the movable holding pin is driven backward to be separated from the inserted side core 100, so that injected resin is filled in a portion of the cavity CV(100) at which the movable holding pin is located. In this case, like the case of using the ejector pin, there is a holding-pin mark on the surface of the insulation cover 101 at or around the position of the end of the movable holding pin. This is because flow of injected resin at or around the end of the movable holding pin in the cavity CV(100) is different from that of injected resin at another portion in the cavity CV(100).

Thus, the ignition coil according to each embodiment can be configured to hermetically seal the holding-pin mark, thus preventing or reducing the occurrence of cracks at the holding-pin mark on the surface of the insulation cover 101.

In addition, when injection of molten resin into the cavity CV(100) is started, the stationary holding pin is driven forward to hold at its one end the arched side core 100 inserted in the cavity CV(100) while the other end is free. Thus, while molten resin is injected in the cavity CV(100), the injection pressure causes the stationary holding pin to be separated from the arched side core 100, so that injected resin is filled in a portion of the cavity CV(100) at which the stationary holding pin is located. In this case, like the case of using the ejector pin, there is a holding-pin mark on the surface of the insulation cover 101 at or around the position of the one end of the stationary holding pin. This is because flow of injected resin at or around the one end of the stationary holding pin in the cavity CV(100) is different from that of injected resin at another portion in the cavity CV(100).

Thus, the ignition coil according to each embodiment can be configured to hermetically seal the holding-pin mark, thus preventing or reducing the occurrence of cracks at the holding-pin mark on the surface of the insulation cover 101.

Figure 13A:
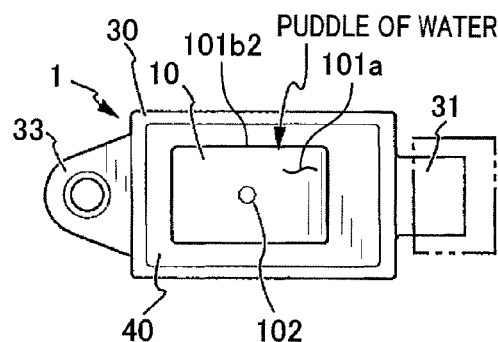
FIG. 13A is a top view of the ignition coil illustrated in FIG. 1 when the ignition coil according to the first embodiment is installed in a motor vehicle while one longitudinal side surface of the insulation cover is disposed horizontally.

On the other hand, as illustrated in FIG. 13A, when the ignition coil 1 is installed in a motor vehicle while one C-shaped longitudinal side surface 101b2 of the insulation cover 101 is disposed horizontally, there may be a puddle of water on the C-shaped longitudinal side surface 101b2 of the insulation cover 101. There might be a risk of the occurrence of a crack in the C-shaped longitudinal side surface 101b2 if an ejector-pin mark was formed on the C-shaped longitudinal side surface 101b2, and exposed from the resin filler 40.

However, as described above, the ignition coil 1 is configured such that the ejector-pin mark 102 is filled in the resin filler 40. This prevents entrance of water into the insulation cover 101 even if there is a puddle of water on an exposed part of the C-shaped longitudinal side surface 101b2.

Figure 13B:
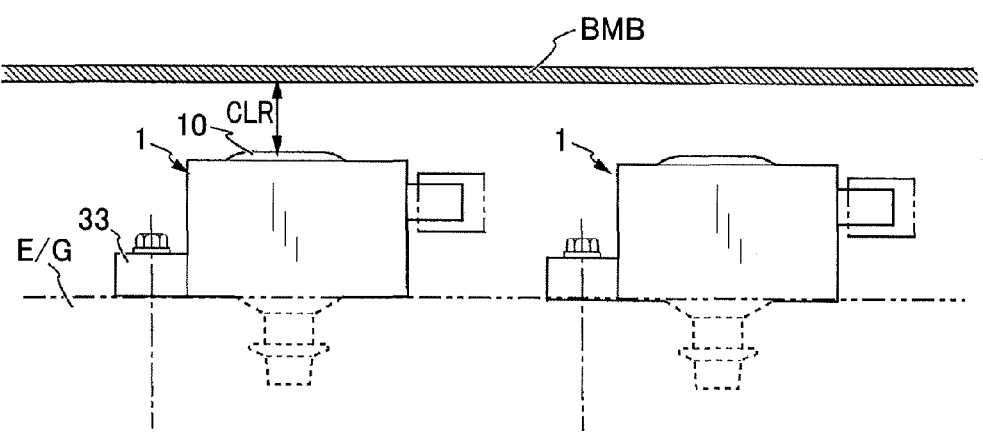
FIG. 13B is a view schematically illustrating a situation where the ignition coil according to the first embodiment is installed in an engine compartment of a motor vehicle while a flange of the ignition coil is fixed to the head of an internal combustion engine.

In addition, FIG. 13B illustrates a situation where the ignition coil 1 is installed in an engine compartment of a motor vehicle while the flange 33 is fixed to the head of an internal combustion engine (E/G). In this situation, there may be a case where the clearance CLR between one inner wall BMB of the engine compartment and the top surface 101a of the exposed part of the insulation cover 101 is narrow. In this case, if an ejector-pin mark 102 was formed on the exposed part of the insulation cover 101, there might be a risk of the occurrence of a crack at the exposed part of the insulation cover 101 when the exposed part of the insulation cover 101 hits on the inner wall BMB of the engine compartment during installation of the ignition coil 1 in the engine compartment.

However, as described above, the ignition coil 1 is configured such that the ejector-pin mark 102 is filled in the resin filler 40. This prevents or reduces the occurrence of a crack at the portion of the insulation cover 101 on which the ejector-pin mark 102 is formed.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An ignition coil comprising:
   a housing having an inner chamber;
   a transformer installed in the inner chamber of the housing, the transformer comprising: a longitudinal center core having first and second ends, a primary winding wound around the longitudinal center core, a secondary winding wound around the primary winding, and a molded side-core assembly,
   the molded side-core assembly comprising: an arched side core magnetically coupled to the first and second ends of the longitudinal center core and located outside a circumferential part of the primary and secondary windings, and an insulation cover molded to cover at least part of the arched side core, the insulation cover having a surface and at least one molding mark formed on the surface thereof; and
   an insulation filler filled in the inner chamber of the housing while the at least part of the arched side core is exposed from the insulation filler and the at least one molding mark is hermetically sealed in the insulation filler.

2. The ignition coil according to claim 1, wherein the insulation cover is comprised of hardened resin demolded from a cavity of a mold using an ejector pin, the hardened resin being based on molten resin injected into the cavity of the mold through a gate formed through the mold while the arched side core is inserted in the cavity, and the at least one molding mark includes at least one of:
   an ejector-pin mark formed on a position of the surface of the insulation cover based on the ejector pin;
   a gate mark formed on a position of the surface of the insulation cover corresponding to a position of the gate; and a gate-mark opposite portion of the surface of the insulation cover, which is opposite to the gate mark.

3. The ignition coil according to claim 2, wherein the resin is injected into the cavity of the mold while a holding pin holds the arched side core inserted in the cavity, and the at least one molding mark further includes a holding-pin mark formed on a position of the surface of the insulation cover based on the holding pin.

4. The ignition coil according to claim 1, further comprising:
   a protrusion holder formed on the surface of the insulation cover, the protrusion holder having a space therein and holding, in the space, a part of the insulation filler to hermetically seal the at least one molding mark.

5. The ignition coil according to claim 4, wherein the space of the protrusion holder communicates with a surface of the insulation filler so that the part of the insulation filler is held in the space based on capillary action.

6. The ignition coil according to claim 1, wherein a portion of the surface of the insulation cover in which the at least one molding mark is included is convexly bulged to have a bulged portion with a thickness greater than a thickness of another portion of the surface of the insulation cover.

\* \* \* \* \*